US012478364B2

(12) United States Patent
Perez et al.

(10) Patent No.: US 12,478,364 B2
(45) Date of Patent: Nov. 25, 2025

(54) RETRACTOR INTRODUCER SYSTEMS

(71) Applicant: Applied Medical Resources Corporation, Rancho Santa Margarita, CA (US)

(72) Inventors: Deryk Perez, Rancho Santa Margarita, CA (US); Joel B. Velasco, Rancho Santa Margarita, CA (US); Cesar Pescador, Rancho Santa Margarita, CA (US); Alicia Lanzoni, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 417 days.

(21) Appl. No.: 18/082,103

(22) Filed: Dec. 15, 2022

(65) Prior Publication Data

US 2023/0112144 A1 Apr. 13, 2023

Related U.S. Application Data

(63) Continuation of application No. PCT/US2021/061395, filed on Dec. 1, 2021.

(60) Provisional application No. 63/119,841, filed on Dec. 1, 2020.

(51) Int. Cl.
*A61B 17/02* (2006.01)
*A61B 17/42* (2006.01)
*A61B 17/00* (2006.01)

(52) U.S. Cl.
CPC ...... *A61B 17/0218* (2013.01); *A61B 17/0293* (2013.01); *A61B 17/42* (2013.01); *A61B 2017/00407* (2013.01); *A61B 2017/0225* (2013.01)

(58) Field of Classification Search
CPC . A61B 17/0218; A61B 17/0293; A61B 17/02; A61B 17/3423
USPC .................................................. 600/201–245
See application file for complete search history.

(56) References Cited

U.S. PATENT DOCUMENTS

2015/0164552 A1\* 6/2015 Chen ..................... A61B 90/00
600/204
2020/0237206 A1\* 7/2020 Young ..................... A61B 1/32

FOREIGN PATENT DOCUMENTS

WO WO 2017/127725 A1 7/2017

OTHER PUBLICATIONS

European Patent Office, The International Search Report and Written Opinion for International Application No. PCT/US2021/061395, entitled "Retractor Introducer Systems," mailed May 17, 2022, 20 pgs.

(Continued)

*Primary Examiner* — Eduardo C Robert
*Assistant Examiner* — Tara Rose E Carter
(74) *Attorney, Agent, or Firm* — Patrick Ikehara

(57) ABSTRACT

A retractor introducer system is provided that includes a circumferential retractor and a retractor introducer. The circumferential retractor retracts and protects a patient's body opening and the retractor introducer facilitates insertion and positioning of the circumferential retractor within the patient's body.

19 Claims, 25 Drawing Sheets

(56) References Cited

OTHER PUBLICATIONS

The International Bureau of WIPO, International Preliminary Report on Patentability forInternational Application No. PCT/US2021/061395, entitled "Retractor Introducer Systems," dated Jun. 15, 2023, 13 pgs.

* cited by examiner

RETRACTOR INTRODUCER SYSTEMS

CROSS-REFERENCE TO RELATED APPLICATIONS

This is a continuation of International Application No. PCT/US2021/61395, filed on Dec. 1, 2021, which claims priority to and benefit of U.S. Provisional Patent Application Ser. No. 63/119,841, filed on Dec. 1, 2020, the disclosures of which are all incorporated herein by reference in their entirety.

BACKGROUND

The present application is generally directed to surgical access devices and more particularly to retractor introducer systems and methods for deploying circumferential protectors-retractors into a body cavity or through an orifice, such as a vaginal canal.

Working space inside the body cavity is always limited, especially when using surgical instruments and devices. Some procedures require placement of a retractor through very small incisions into relatively small body cavities, often with poor or limited visibility.

During such procedures, it is often difficult for a surgeon to collapse an inner ring of a retractor, insert it through the incision and properly deploy it in the body cavity. In use, the inner ring of the retractor is collapsed for insertion through an incision or a natural orifice. Once placed, the inner ring requires a particular "bounce back" force to ensure that while the device is retracted and in use during surgery, the inner ring does not collapse, which would result in loss of retraction and possibly dislodging of the retractor.

In other procedures, such as in vaginal natural orifice trans-endoscopic surgery (otherwise known as vNOTES), a retractor is used to retract the vaginal canal and/or incision so that the surgeon can complete a vaginal access adnexal procedure. The surgeon begins this procedure by making an incision adjacent to and on the posterior side of the patient's cervix (a posterior colpotomy). The surgeon then deploys a retractor through the incision by collapsing the inner ring and inserting it through the posterior colpotomy into the pelvic cavity to anchor on the internal side of the cervix, bladder and posterior fornix of the uterus.

This step of the procedure is especially difficult typically due to the small size of the inner ring of the retractor and the length of the vaginal canal, through which it must pass in order to properly anchor on the other side of the incision. Typically, a surgeon uses his or her hands to collapse the inner ring and feed it though the vaginal canal. The inner ring of the retractor has a diameter that leaves little space for the surgeon's hand to both collapse and guide the inner ring through the incision.

Keeping the ring collapsed during the insertion process can also be a problem for surgeons due to the ring's diameter, flexibility, and durometer. As such, the ring does not remain in a collapsed shape easily and tends to twist and bow as the pressure is applied by the surgeon for insertion. Additionally, there can be limited visibility during this step in the procedure due to the narrow vaginal canal and a physician's hand blocking the view of the colpotomy, so achieving correct placement can be very difficult. As such, this step in the procedure may take multiple attempts to successfully complete, which adds to surgeon frustration and overall increased procedure time. In an attempt to mitigate the difficulties of this step, some surgeons use surgical forceps or clamps to insert the inner ring through the colpotomy. This can cause unintended consequences, such as film tears. The same challenges may arise for small incisions/openings and/or other procedures where a retractor is typically inserted by hand.

SUMMARY

In accordance with various embodiments, a retractor introducer system is provided. The retractor introducer system comprises a circumferential protector/retractor and retractor introducer. In various embodiments, the circumferential protector comprises an outer ring, an inner ring, a sheath, or any combination thereof. In various embodiments, the retractor introducer comprises an actuator, a retractor blade, and/or a handle.

In accordance with various embodiments, a retractor introducer system is provided and comprises a retractor and a retractor introducer. The retractor comprises an outer ring arranged to be placed outside of a body cavity, an inner ring arranged to be placed inside of the body cavity, and a sheath having a proximal end connected to the outer ring and a distal end connected the inner ring, the sheath delimiting an access channel extending from the outer ring to the inner ring. The retractor introducer is arranged to releasably support the inner ring and comprises a retractor blade, an actuator and/or a handle. The retractor blade comprises a proximal end, a distal end and a longitudinal axis extending from the proximal end of the retractor blade to the distal end of the retractor blade. The actuator is slidably attached to the retractor blade and translatable along the retractor blade from the proximal end of the retractor blade towards the distal end of the retractor blade and retractable back from the distal end of the retractor blade towards the proximal end of the retractor blade. The handle is connected to the retractor blade and extends in a direction transverse to the longitudinal axis of the retractor blade.

In accordance with various embodiments, a retractor introducer system is provided comprising a circumferential retractor/protector and a retractor introducer arranged to support, guide, and place the circumferential retractor/protector. In various embodiments, the retractor introducer in its entirety is pivotable. In various embodiments, the retractor introducer comprises an actuator, a retractor blade and/or a handle, none of which are individually pivotable relative to the others. In various embodiments, the retractor introducer is generally L-shaped. In various embodiments, the retractor introducer is generally L-shaped with the actuator moved to a distal position and generally T-shaped with the actuator moved to a proximal position. In various embodiments, the retractor introducer is more rigid than the circumferential retractor. In various embodiments, the retractor introducer is arranged to be positioned in an anterior position and repositioned in a posterior position relative to an incision. In various embodiments, the retractor introducer is arranged to be positioned in a first position to guide and push one portion of the retractor distally and inverted relative to the first position to guide and push a different portion of the retractor distally. In various embodiments, the handle extends in one direction with the retractor introducer positioned in the first position and the handle extends in an opposite direction with the retractor introducer inverted relative to the first position.

In accordance with various embodiments, a retractor introducer comprises a handle, a retractor blade, and/or an actuator. In various embodiments, the actuator is movable relative to the retractor blade. In various embodiments, the handle is stationary relative to the actuator. In various embodiments, the handle is removably attached to the retractor blade. In various embodiments, the actuator has a width equal to or smaller than a width of the retractor blade. In various embodiments, the retractor blade comprises a channel extending lengthwise along the retractor blade. In various embodiments, the channel extends lengthwise along opposing sides of the retractor blade. In various embodiments, the actuator comprises a ledge arranged to translate along the channel as the actuator is moved distally and proximally. In various embodiments, the retractor blade has an I-Beam cross-sectional shape. In various embodiments, the retractor blade has a lower portion and an upper portion, the lower portion having a width greater than a width of the upper portion. In various embodiments, the retractor blade and/or the actuator has a blunt atraumatic tip. In various embodiments, the retractor blade is at least 7.5 centimeters long.

In accordance with various embodiments, the retractor blade comprises a lower retractor blade and an upper retractor blade spaced from the lower retractor blade. In various embodiments, the lower retractor blade is wider than the upper retractor blade. In various embodiments, the actuator is wider than the upper retractor blade and the lower retractor blade is wider than the actuator. In various embodiments, the actuator comprises at least one ledge slidably connected and translatable between the upper and lower retractor blades. In various embodiments, a first channel is disposed between the upper and lower retractor blades and a second channel is disposed between the upper and lower retractor blades with the first and second channels disposed on opposing sides of each other. In various embodiments, the actuator comprises a first ledge disposed on one side of the actuator and disposed in the first channel, the first ledge being translatable within the first channel with linear movement of the actuator along the upper retractor blade. In various embodiments, the actuator comprises a second ledge disposed on one side of the actuator and disposed in the second channel, the second ledge being translatable within the second channel with linear movement of the actuator along the upper retractor blade.

In accordance with various embodiments, the retractor blade comprises at least one rib engaged with the actuator to prevent the actuator from separating from the retractor blade. In various embodiments, the retractor blade comprises at least one rib preventing proximal movement of the actuator relative to the retractor blade beyond a predetermined point. In various embodiments, the actuator comprises at least one hook arranged to engage the at least one rib. In various embodiments, the at least one hook extends from the actuator near a distal portion of the actuator and the at least one rib extends from the retractor blade near a proximal portion of the retractor blade. In various embodiments, the at least one hook has a distal facing curved surface and the at least one rib has a proximal facing curved surface. In various embodiments, the at least one hook has a proximal facing flat surface and the at least one rib has a distal facing flat surface. In various embodiments, the at least one hook has a proximal facing surface and the at least one rib has a distal facing surface, the proximal facing surface of the at least one hook arranged to match the distal facing surface of the at least one rib. In various embodiments, the at least one rib extends in a direction transverse to the longitudinal axis of the retractor blade. In various embodiments, the at least one hook extends in a direction transverse to the longitudinal axis of the retractor blade.

In accordance with various embodiments, the retractor blade comprises one or more dovetails, protrusions or projections and the actuator comprises one or more channels disposed at or near a middle portion of the actuator and extending lengthwise along the actuator with the one or more channels arranged to receive the one or more dovetails and translatable along the one or more dovetails. In various embodiments, a dovetail has one or more protrusions arranged to fit within a channel with the dovetail being on the retractor blade or the actuator with the corresponding channel being on the actuator or the retractor blade. In various embodiments, the dovetail comprises a plurality of dovetails spaced along the retractor blade. In various embodiments, the channel has a cross-sectional inverted trapezoidal shape and in various embodiments, the dovetail has a slanted edge. In various embodiments, the dovetail is a male dovetail and the channel is a female dovetail. In various embodiments, the retractor blade comprises a rack and the actuator comprises a pawl engageable with the rack to incrementally control movement of the actuator relative to the retractor blade. In various embodiments, the retractor blade comprises a pawl and the actuator comprises a rack engageable with the rack to incrementally control movement of the actuator relative to the retractor blade.

In accordance with various embodiments, a channel extends lengthwise along a middle portion of the retractor blade. In various embodiments, the actuator comprises a protrusion arranged to fit with the channel and arranged to translate along the channel as the actuator is moved. In various embodiments, the actuator comprises a dovetail, protrusion or projection having a slanted surface arranged to fit within a channel of the retractor blade having a corresponding slanted surface and arranged to translate along the channel as the actuator is moved. In various embodiments, the actuator comprises a channel extending lengthwise along the actuator. In various embodiments, the retractor blade comprises a dovetail, protrusion or projection having a slanted surface arranged to fit within the channel of the actuator having a corresponding slanted surface and arranged to translate along the channel as the actuator is moved. In various embodiments, the retractor blade comprises a channel and the actuator comprises a protrusion arranged to translate along the channel of the retractor blade as the actuator is moved. In various embodiments, the actuator comprises a channel and the retractor blade comprises a protrusion, the channel of the actuator movable along the protrusion of the retractor blade as the actuator is moved. In various embodiments, the retractor blade or the actuator comprises a ratchet to incrementally regulate movement of the actuator relative to the retractor blade.

In accordance with various embodiments, the retractor blade has a tapered, blunt and/or atraumatic tip. In various embodiments, the upper retractor blade has a tapered tip and/or the lower retractor blade has a tapered tip. In various embodiments, the actuator has a curved outer surface extending lengthwise along the actuator. In various embodiments, the retractor blade has a flat outer surface extending lengthwise along the retractor blade. In various embodiments, the upper retractor blade has a flat outer surface extending lengthwise along the upper retractor blade and/or the lower retractor blade has a flat outer surface extending lengthwise along the lower retractor blade. In various embodiments, the actuator is inseparable from the retractor blade. In various embodiments, the actuator is inseparable from the upper retractor blade. In various embodiments, the actuator is unable to pivot away from the retractor blade.

In accordance various embodiments, the actuator comprises a tip positioned under an overhanging lip, the tip having sidewalls with outwardly curved surfaces. In various embodiments, the sidewalls with outwardly curved surfaces are arranged to match a curved surface of the inner ring. In various embodiments, the actuator comprises a distal tip having a convex curvature configured to engage the inner ring. In various embodiments, the convex curvature of the distal tip is arranged to engage a concave portion of the inner ring in contact with the distal tip of the actuator. In various embodiments, the actuator comprises a distal tip having an overhanging lip. In various embodiments, the overhanging lip and an upper surface of the retractor blade support a portion of the inner ring between the overhanging lip and the upper surface of the retractor. In various embodiments, the actuator comprises a divot configured to contact a portion of the inner ring. In various embodiments, the divot is concave and is delimited by a distal surface on a distal portion of the distal tip of the actuator. In various embodiments, the divot is concave and is arranged to engage a convex portion of the inner ring in contact with the divot of the actuator. In various embodiments, the divot is concave and is arranged to support and engage the inner ring in a partially collapsed state. In various embodiments, the divot has an inwardly curved surface arranged to match a curved surface of the inner ring in a partially collapsed state.

In accordance various embodiments, the actuator comprises a proximal flange at the proximal end of the actuator, the proximal flange extending in a direction transverse to the longitudinal axis of the retractor blade. In various embodiments, the proximal flange has a curved surface with an indentation within the curved surface. In various embodiments, the proximal flange in contact with the handle prevents distal movement of the actuator. In various embodiments, the handle comprises a recess and the proximal flange is arranged to fit within the recess of the handle. In various embodiments, the proximal flange is graspable, grippable and/or movable by a user. In various embodiments, the actuator is moveable by a user. In various embodiments, movement of the proximal flange moves the actuator. In various embodiments, the handle is graspable and/or grippable by a user. In various embodiments, the handle is generally cylindrical in shape. In various embodiments, the handle has an outwardly distal tapered end or base.

In accordance with various embodiments, the retractor blade is placed between the actuator and surrounding tissue. In various embodiments, the retractor blade provides point retraction and/or limited area retraction. In various embodiments, the retractor blade is linear lengthwise. In various embodiments, the retractor blade is curved and/or has a curved distal tip. In various embodiments, the retractor blade and/or actuator comprises a ratchet, linear rack and/or teeth. In various embodiments, the ratchet is disengageable allowing free movement of the actuator relative to the retractor blade. In various embodiments, the retractor blade includes a channel or groove having teeth or protrusions arranged to engage with a tooth or pawl extending from the actuator. In various embodiments, the actuator is incrementally and/or selectively movable relative to the retractor blade.

In accordance with various embodiments, the retractor introducer comprises an actuator, a first retractor blade, a second retractor blade having a length longer than a length of the first retractor blade, and/or a handle and/or the actuator are removably connected to the first retractor blade and the second retractor blade. In various embodiments, the actuator is movable relative to the first retractor blade and the second retractor blade. In various embodiments, the handle is stationary relative to the actuator. In various embodiments, the actuator has an overhanging lip and a divot disposed between outwardly curved side surfaces. In various embodiments, the actuator is moveable by a user. In various embodiments, the first retractor blade, the second retractor blade or both comprises a ratchet to incrementally regulate movement of the actuator relative to the respective first or second retractor blade.

Many of the attendant features of the present inventions will be more readily appreciated as the same becomes better understood by reference to the foregoing and following description and considered in connection with the accompanying drawings.

BRIEF DESCRIPTION OF THE DRAWINGS

The present inventions may be better understood taken in connection with the accompanying drawings in which the reference numerals designate like parts throughout the figures thereof.

DETAILED DESCRIPTION

Figure 1:
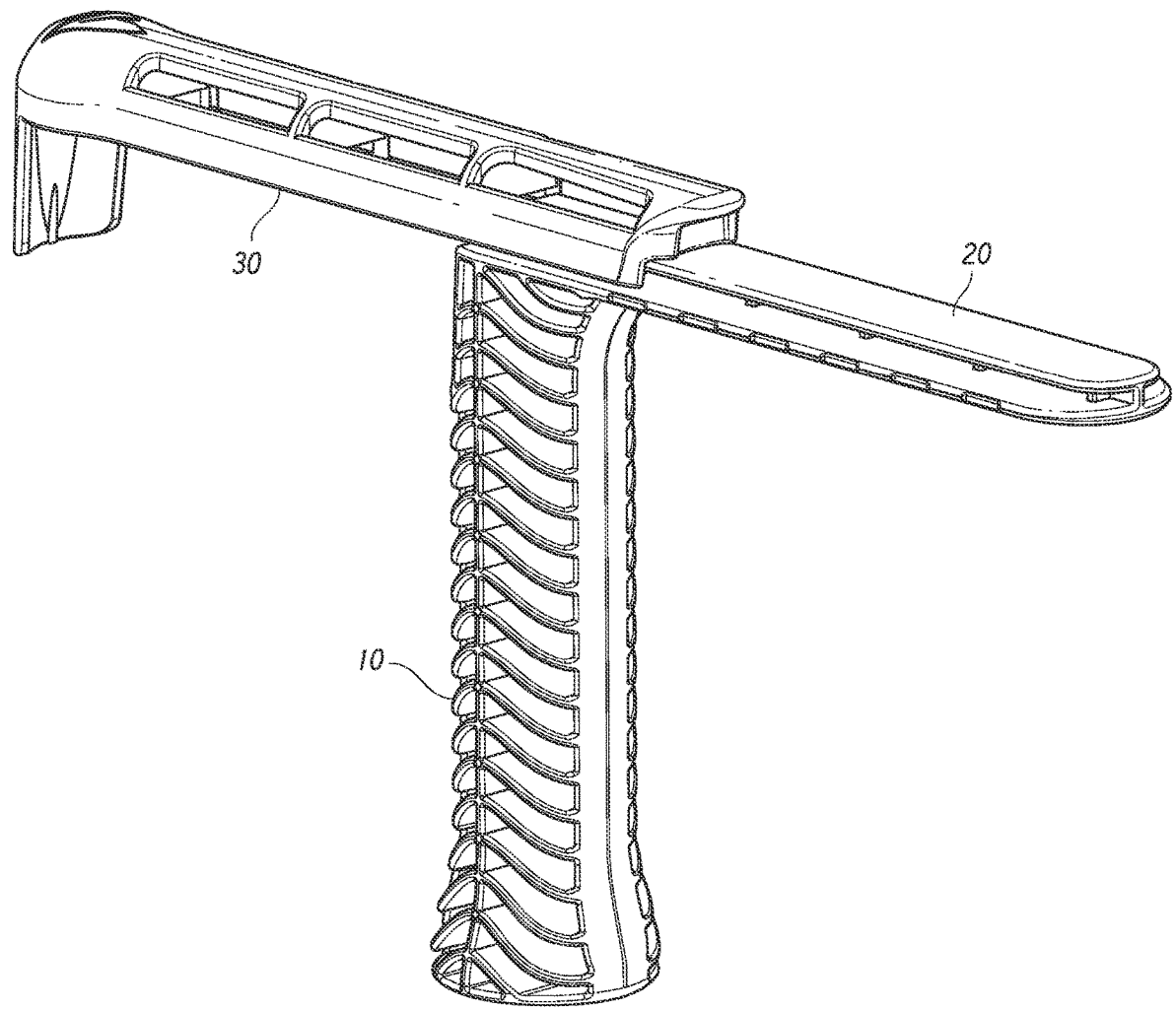
FIG. 1 is a perspective view of a retractor introducer with an actuator in a first spaced position in accordance with various embodiments of the present invention.
Figure 2:
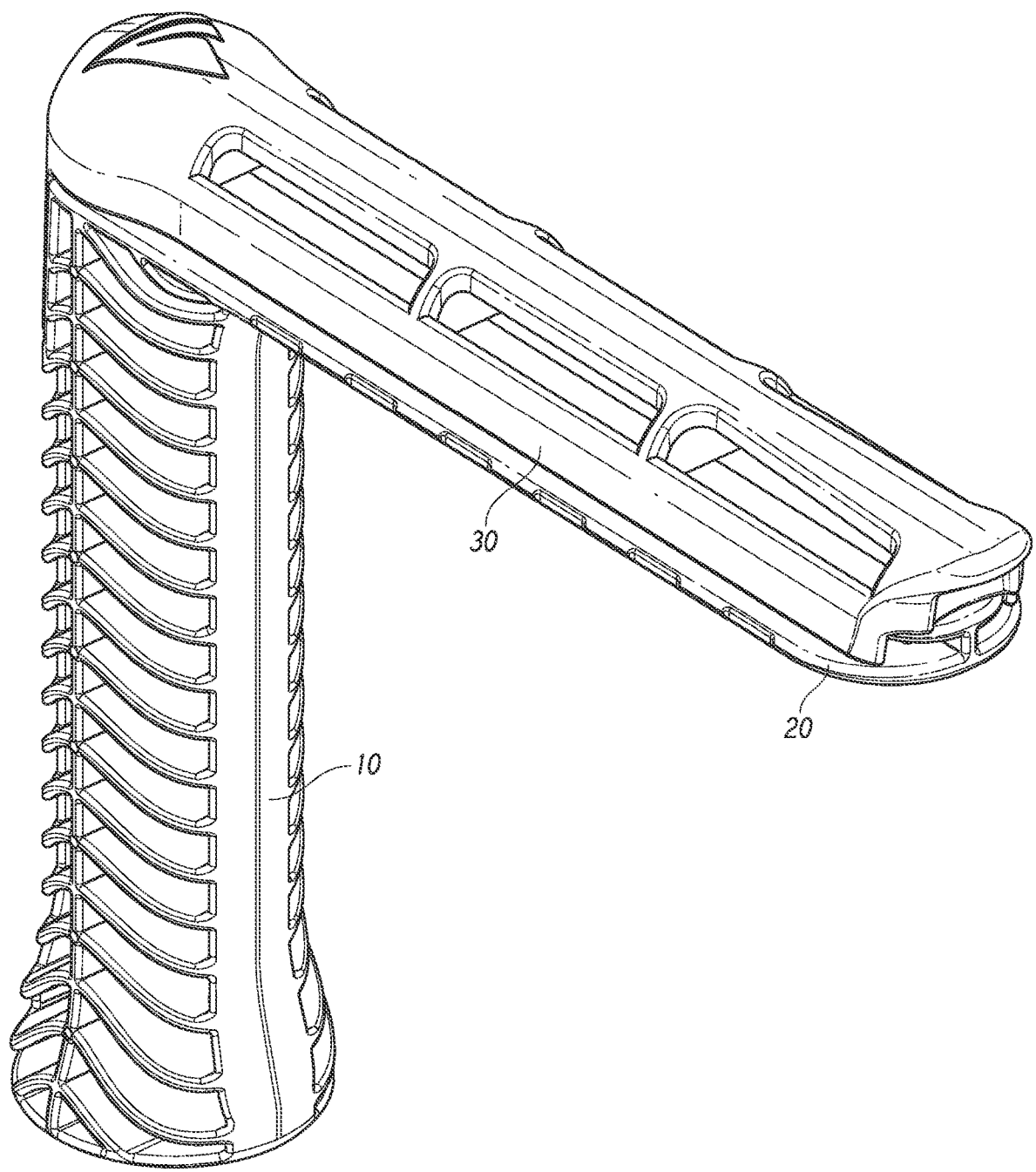
FIG. 2 is a perspective view of a retractor introducer with an actuator in a second proximate position in accordance with various embodiments of the present invention.
Figure 3:
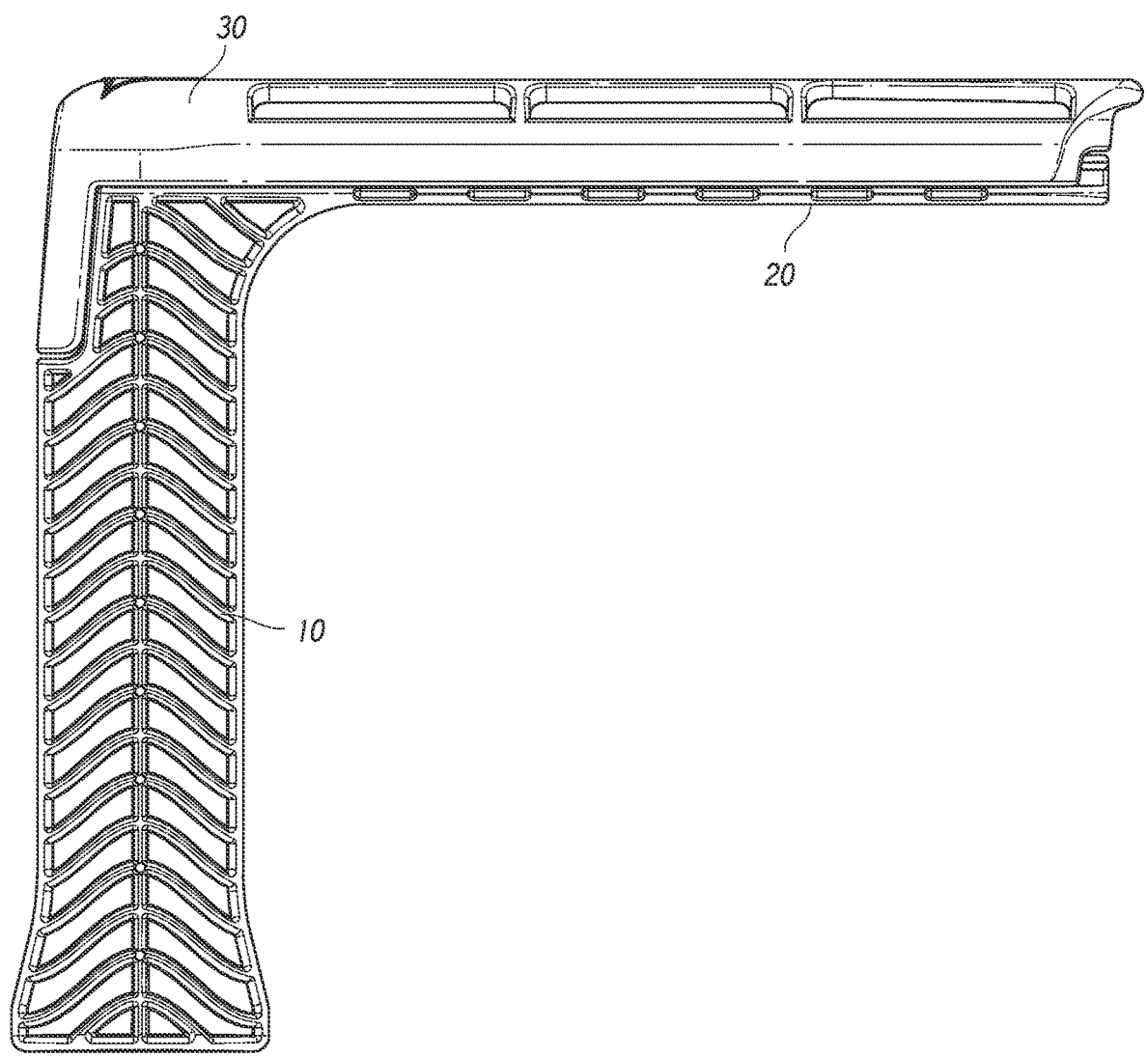
FIG. 3 is a side view of a retractor introducer in accordance with various embodiments of the present invention.
Figure 4:
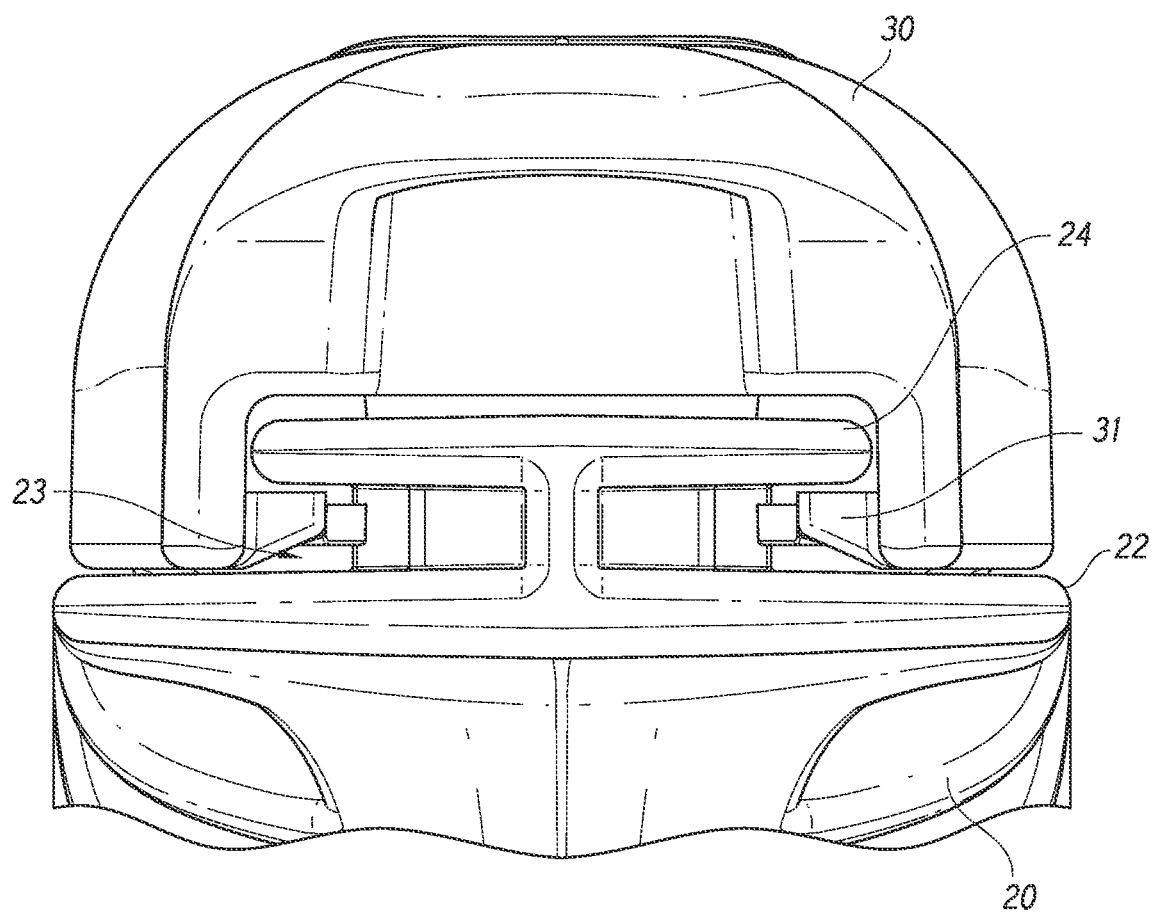
FIG. 4 is a front view of portions of a retractor introducer in accordance with various embodiments of the present invention.
Figure 5:
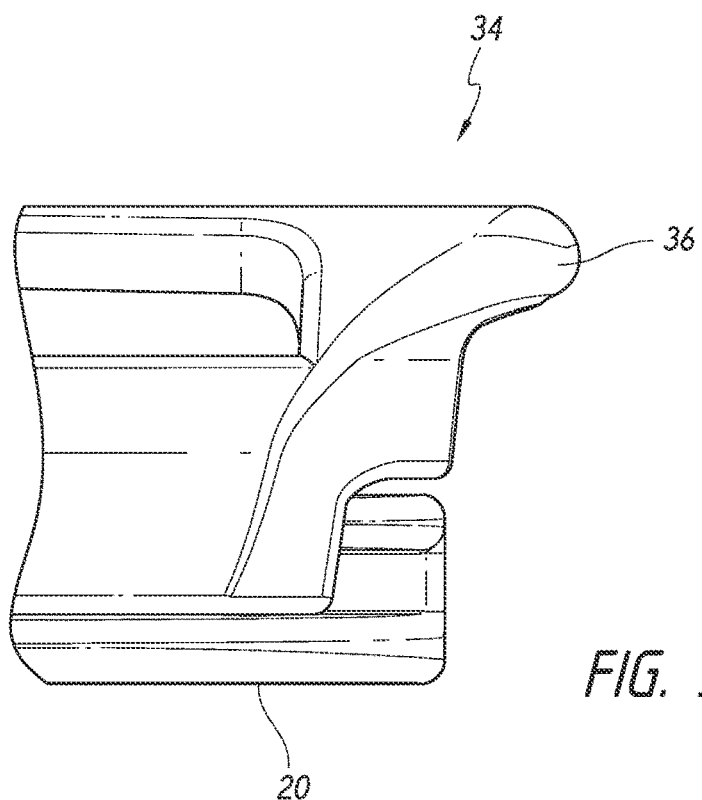
FIG. 5 is a side view of portions of a retractor introducer in accordance with various embodiments of the present invention.
Figure 6:
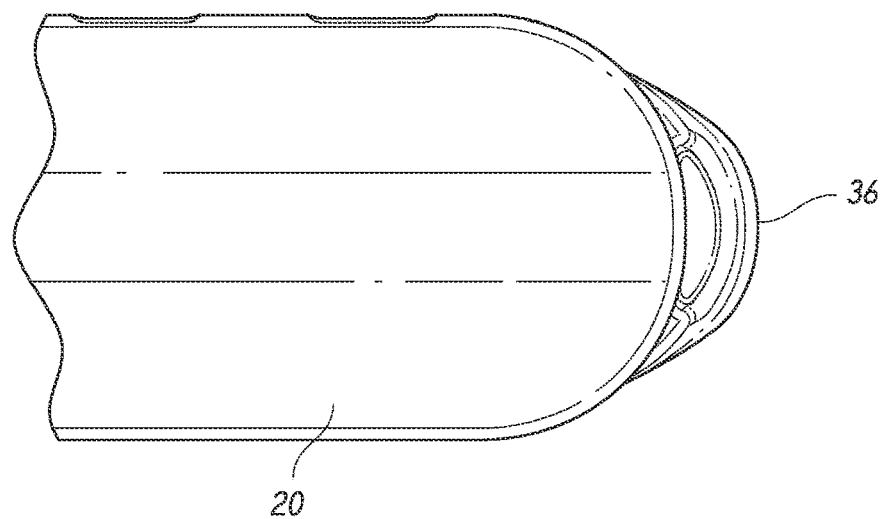
FIG. 6 is a bottom view of portions of a retractor introducer in accordance with various embodiments of the present invention.
Figure 7:
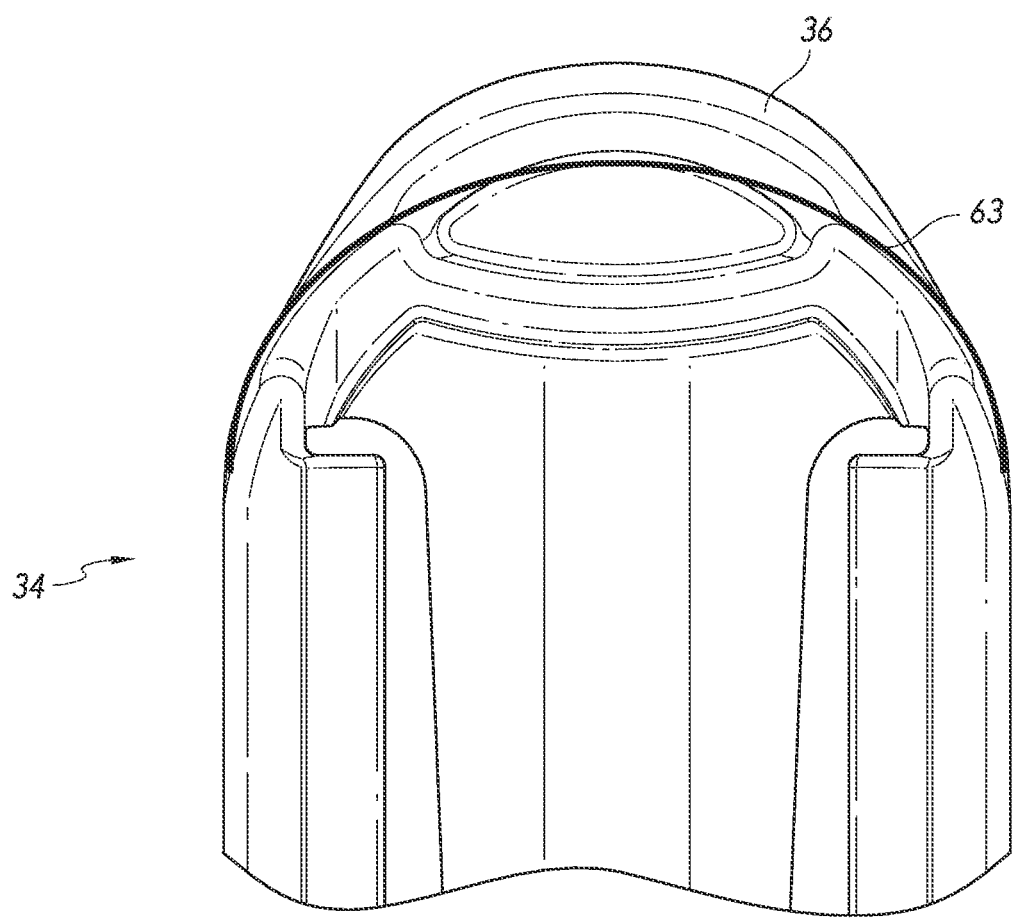
FIGS. 7-8 are bottom views of portions of an actuator in accordance with various embodiments of the present invention.
Figure 8:
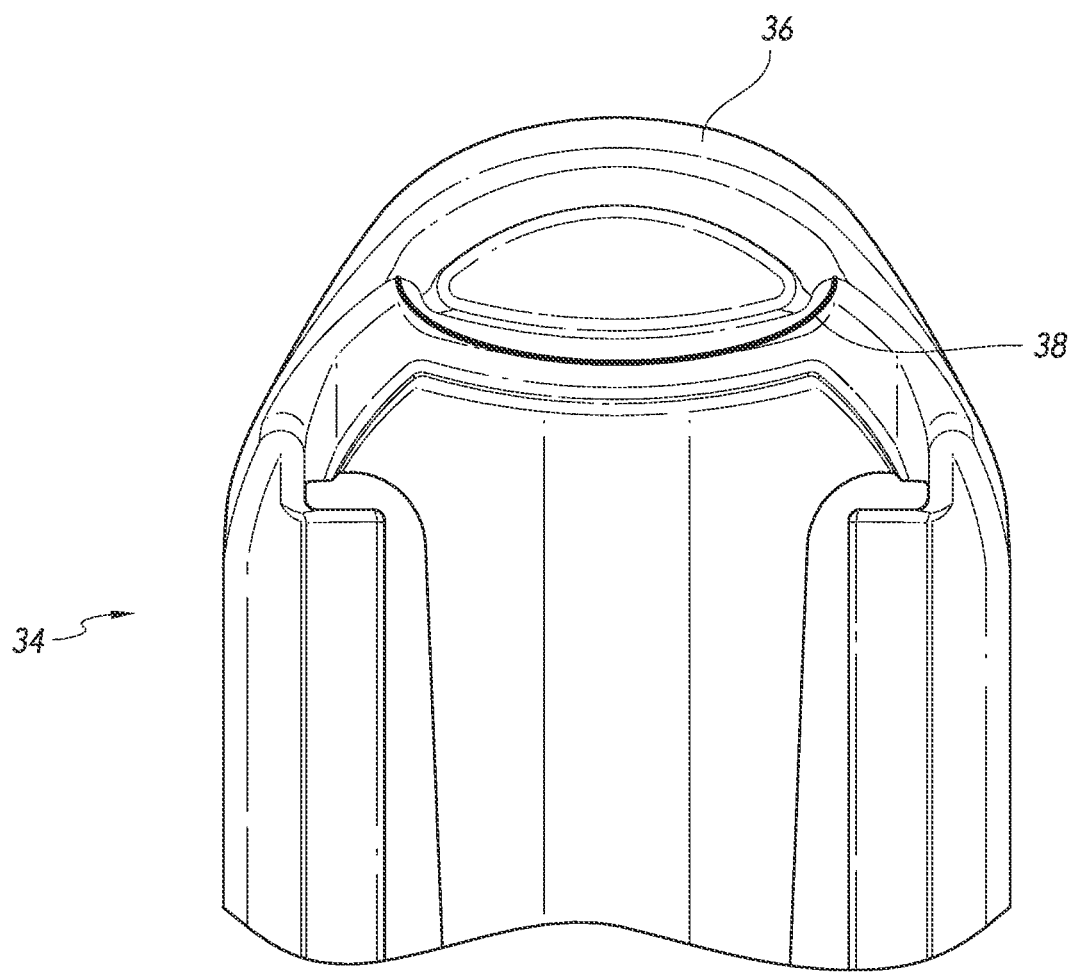
Figure 9:
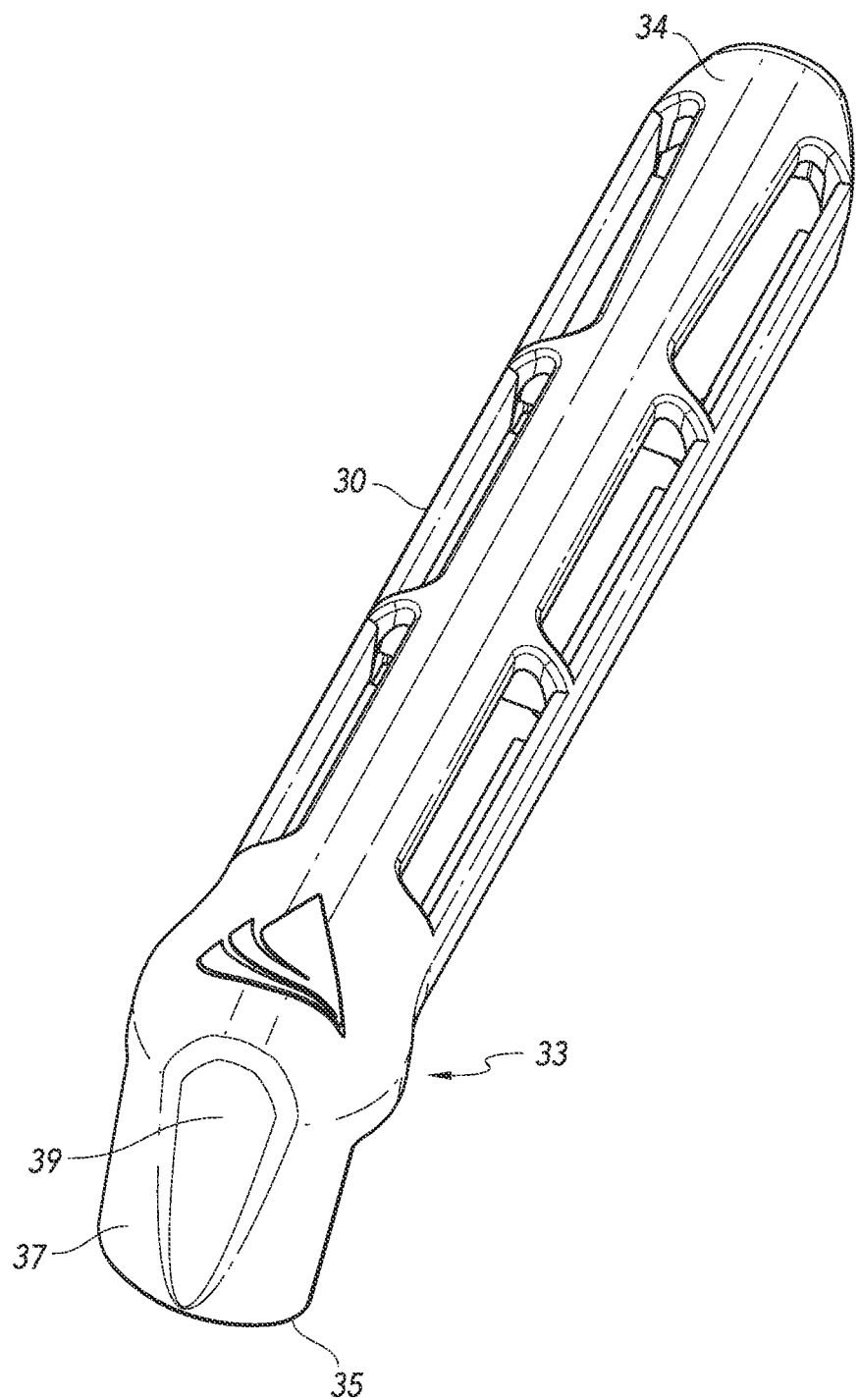
FIGS. 9-11 are perspective views of an actuator in accordance with various embodiments of the present invention.
Figure 10:
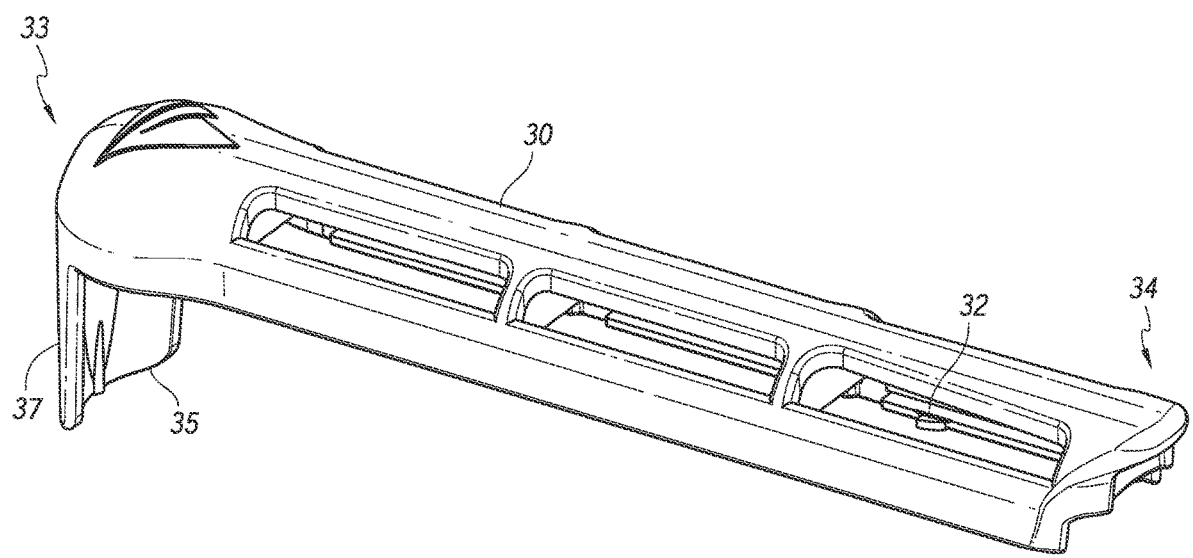
Figure 11:
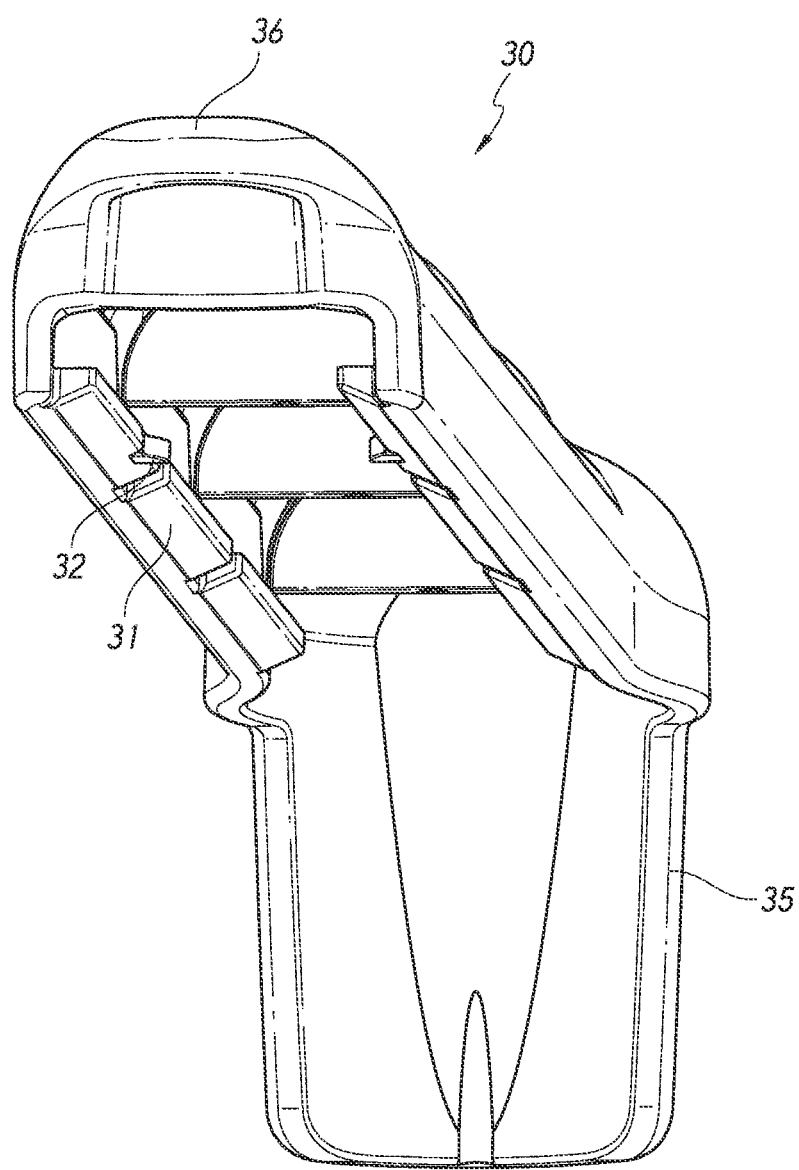
Figure 12:
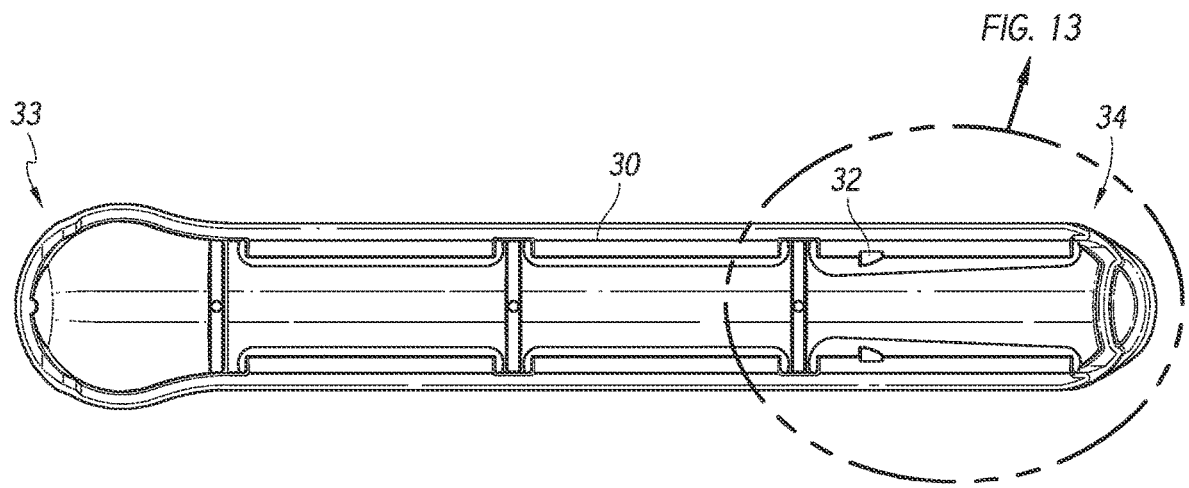
FIG. 12 is a bottom view of an actuator in accordance with various embodiments of the present invention.
Figure 13:
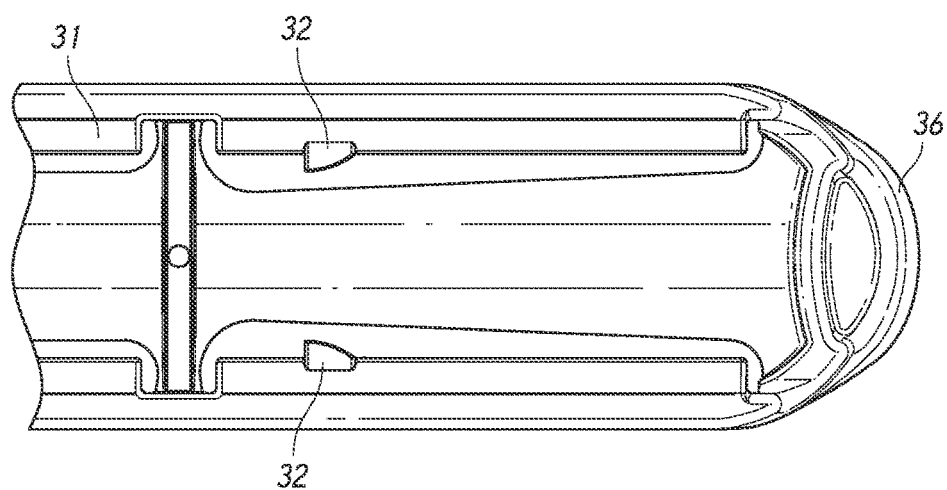
FIG. 13 is a bottom view of portions of an actuator in accordance with various embodiments of the present invention.
Figure 14:
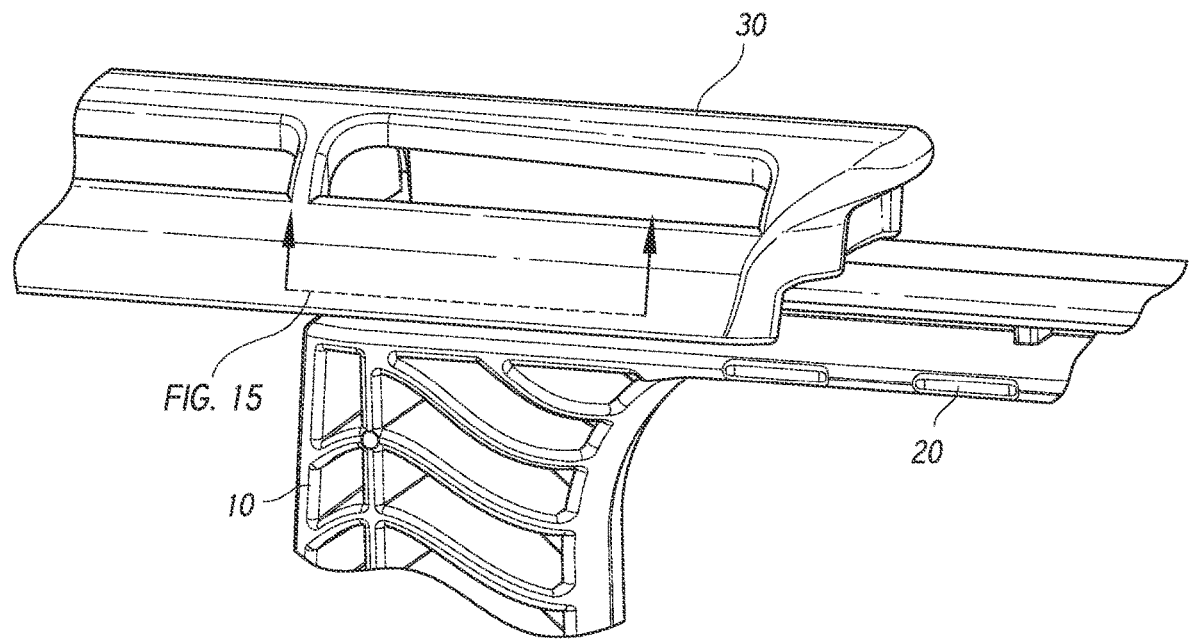
FIG. 14 is a perspective view of portions of a retractor introducer in a spaced or stop position in accordance with various embodiments of the present invention.
Figure 15:
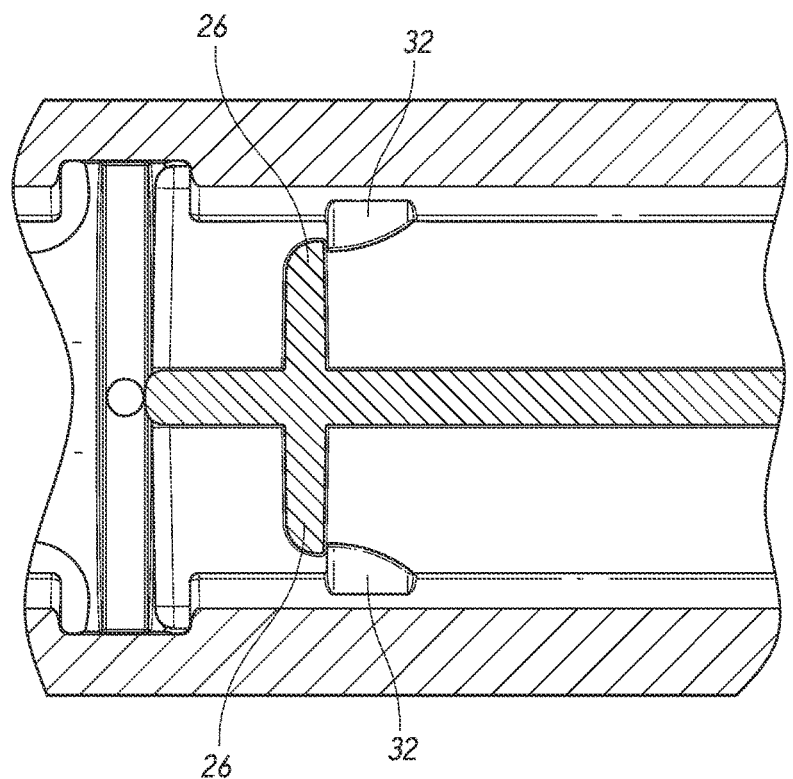
FIG. 15 is a top view of portions of a retractor introducer in a spaced or stop position in accordance with various embodiments of the present invention.
Figure 16:
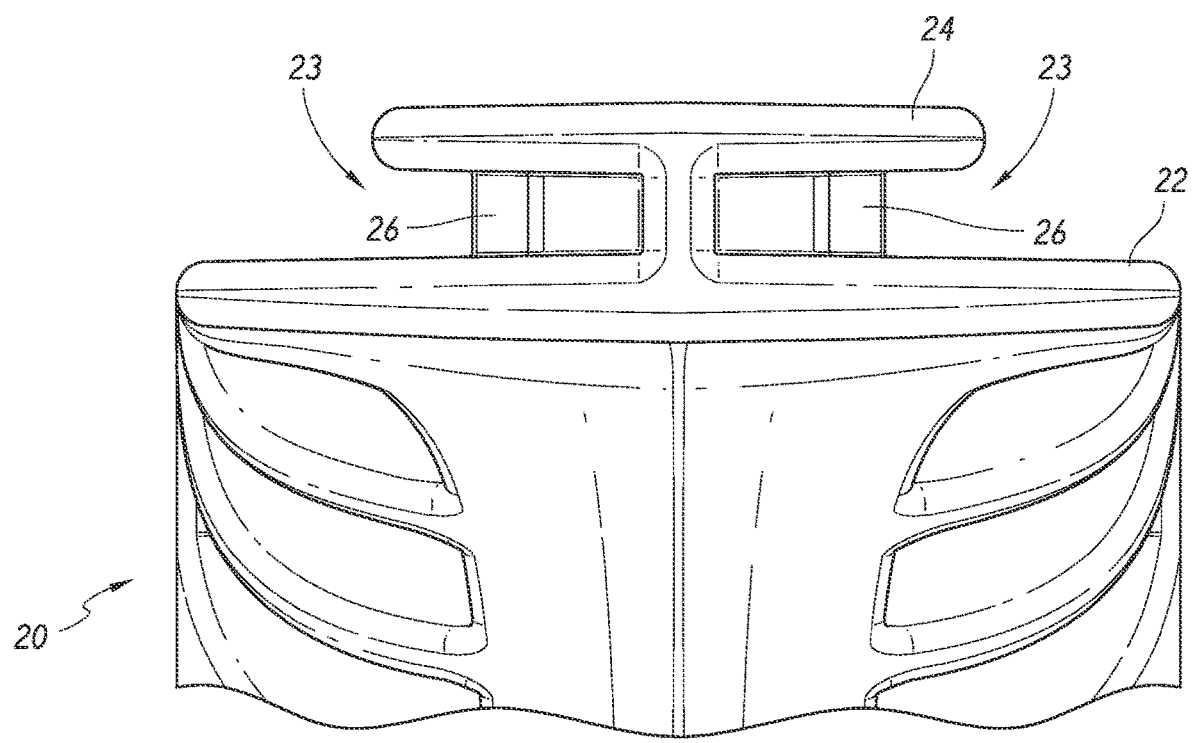
FIG. 16 is a front view of portions of a retractor blade in accordance with various embodiments of the present invention.
Figure 17:
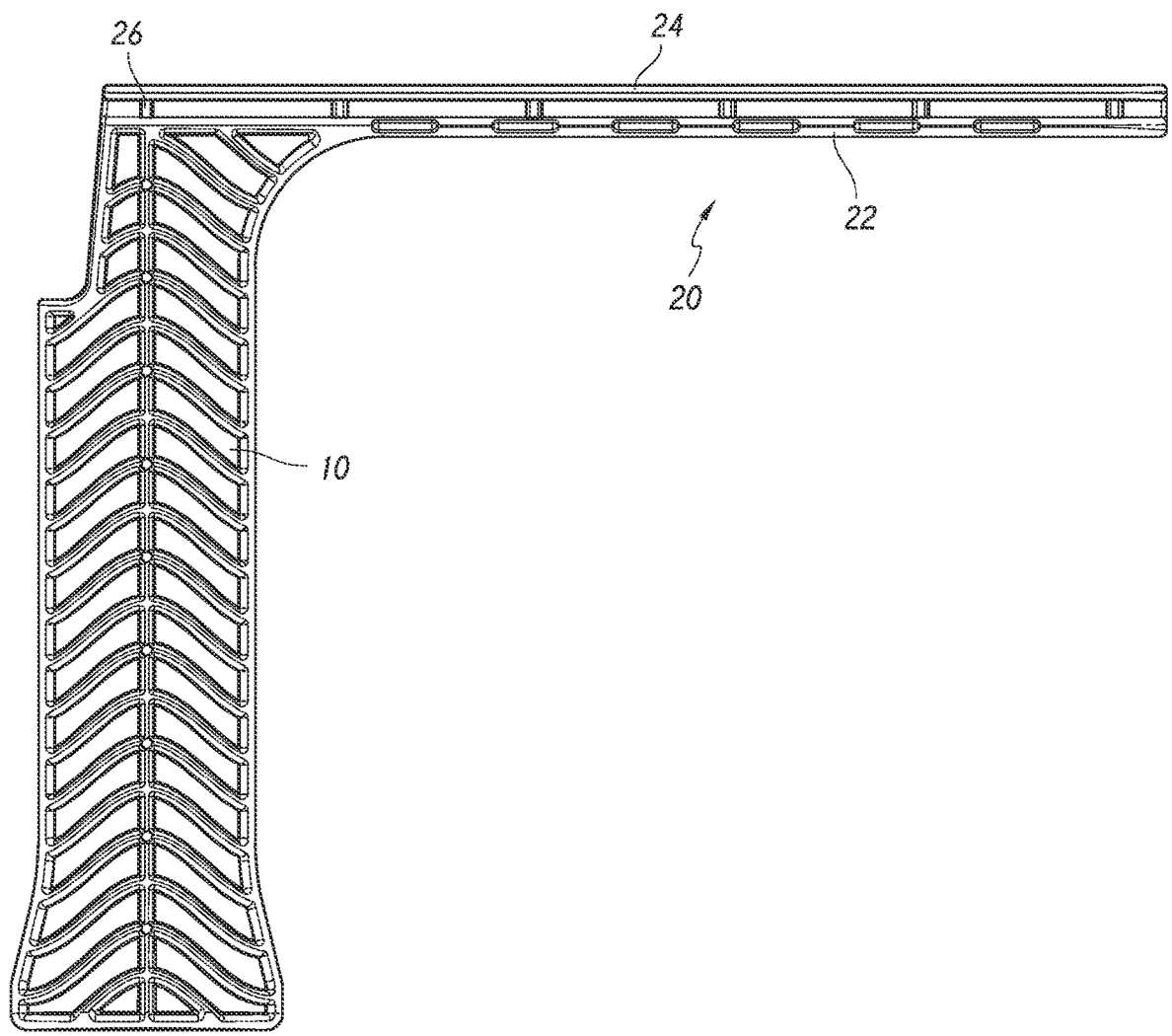
FIG. 17 is a side view of a retractor blade in accordance with various embodiments of the present invention.
Figure 18:
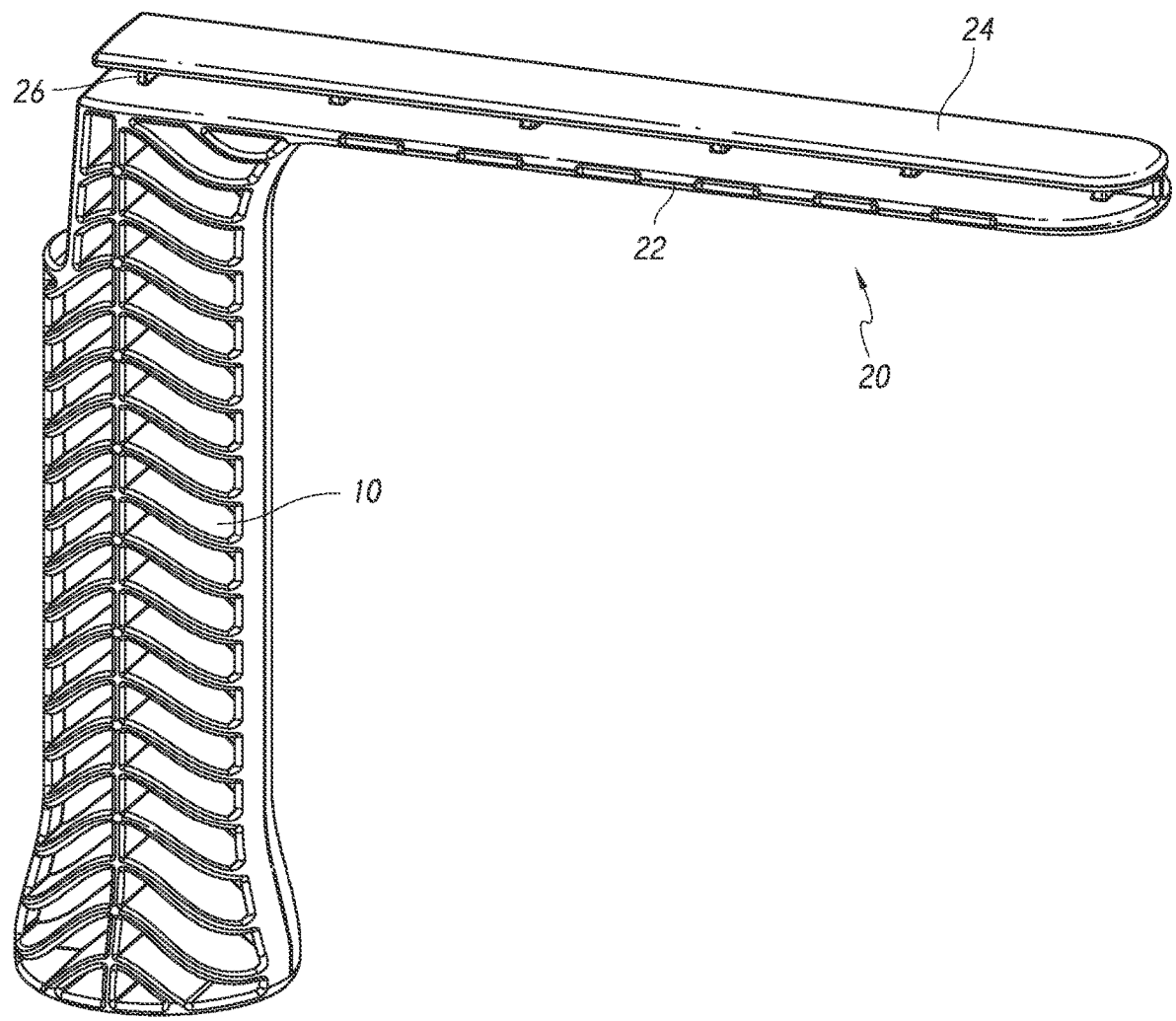
FIG. 18 is a perspective view of a retractor blade in accordance with various embodiments of the present invention.
Figure 19:
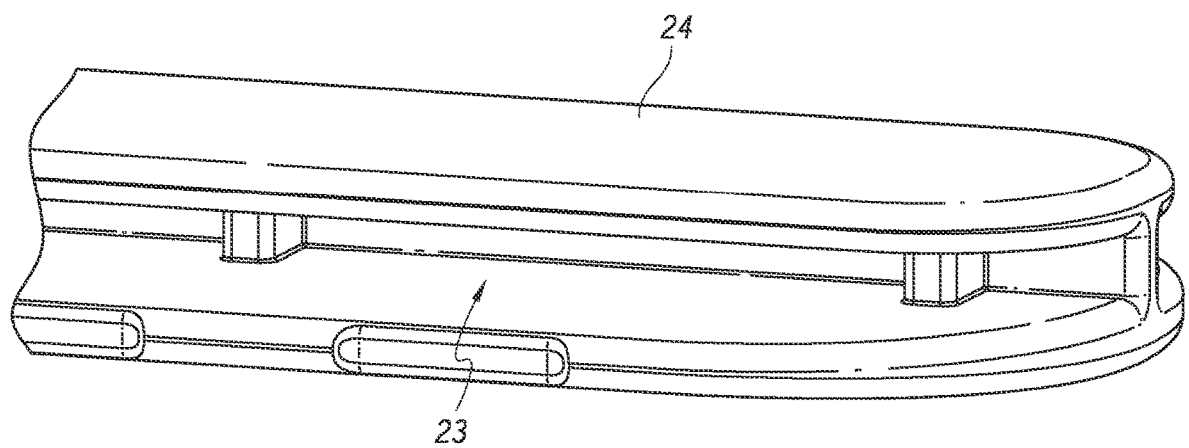
FIG. 19 is a perspective view of portions of a retractor blade in accordance with various embodiments of the present invention.
Figure 20:
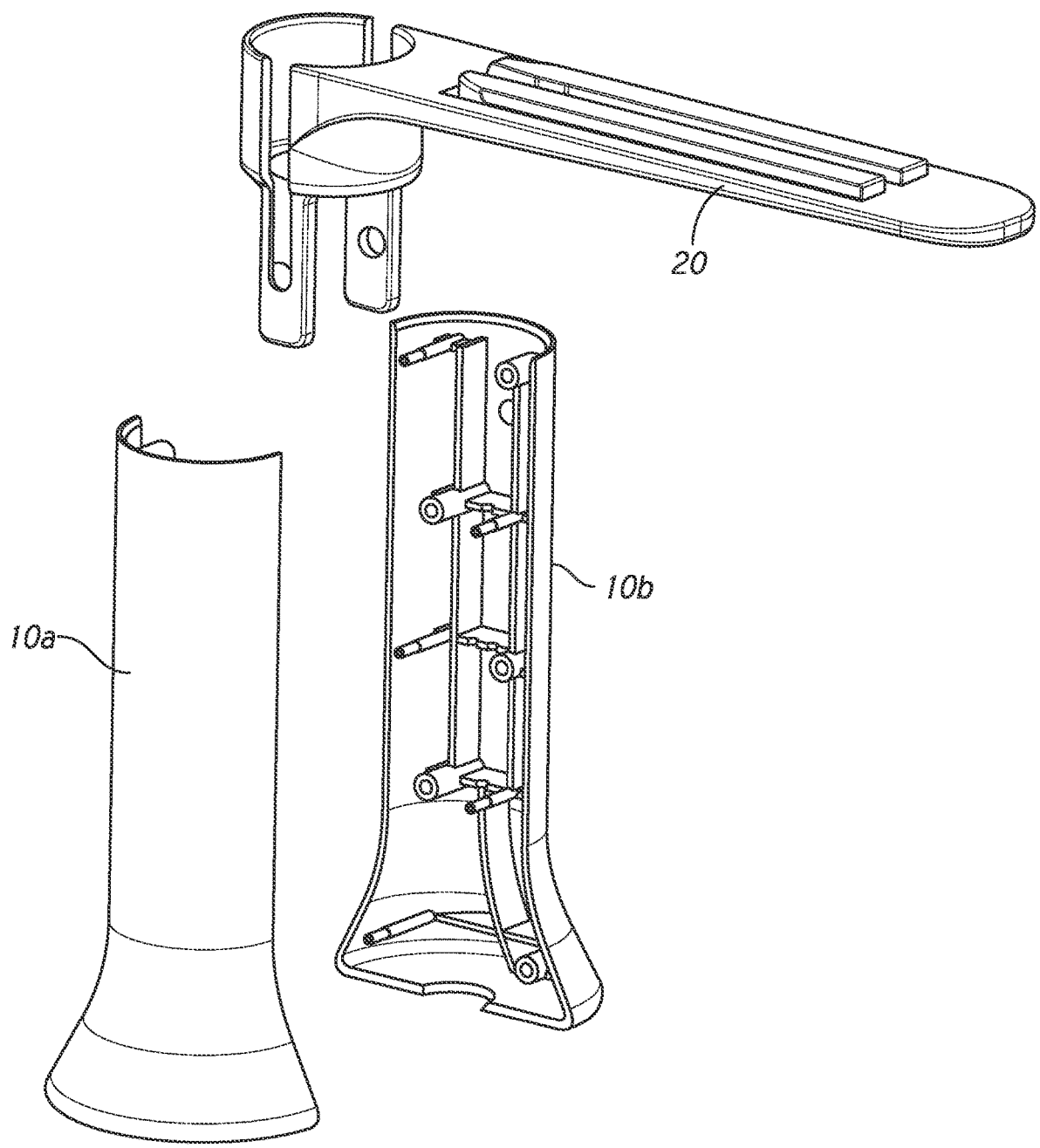
FIG. 20 is a perspective view of a retractor blade and handle in accordance with various embodiments of the present invention.
Figure 21:
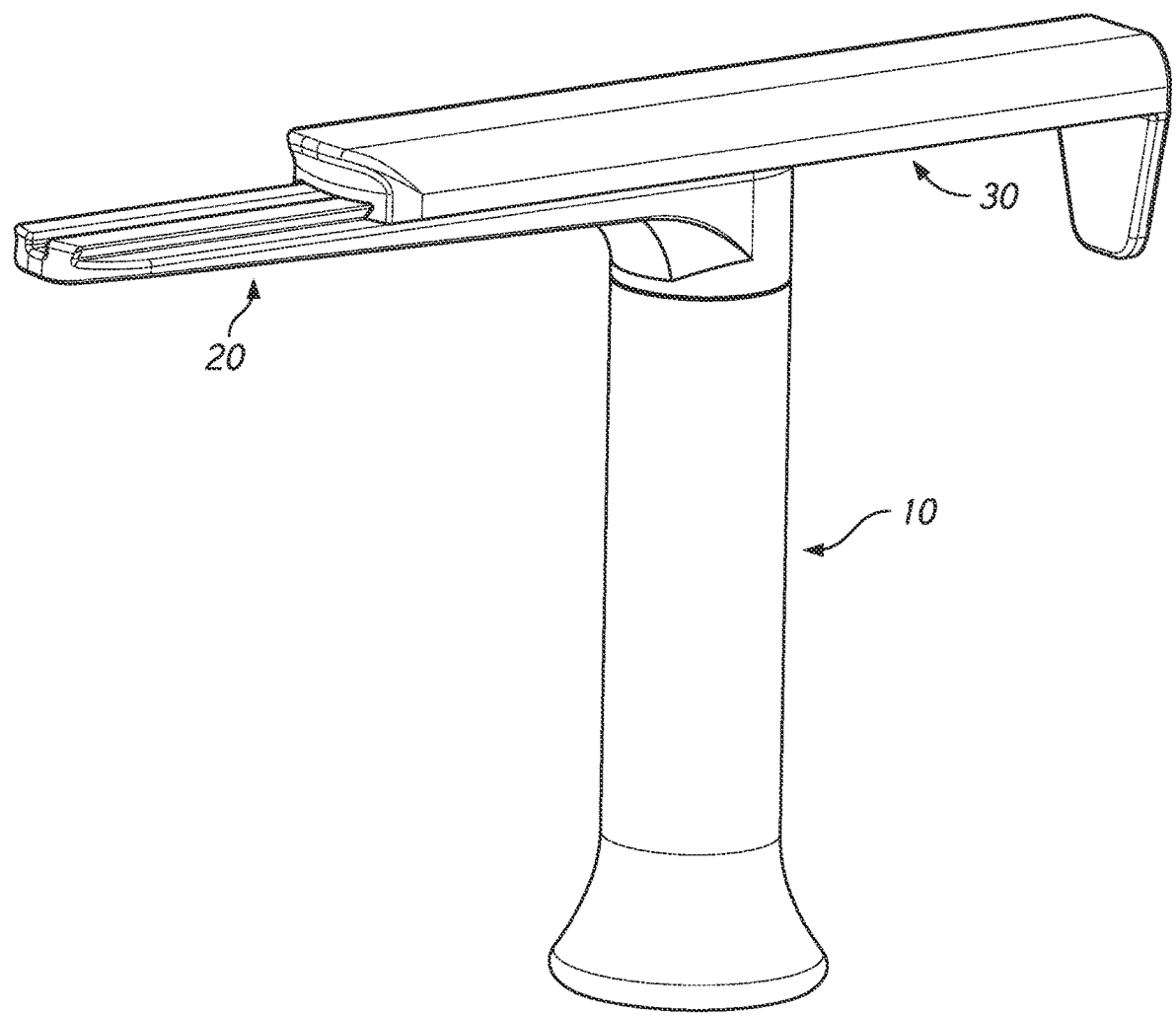
FIG. 21 is a perspective view of a retractor introducer in accordance with various embodiments of the present invention.
Figure 22:
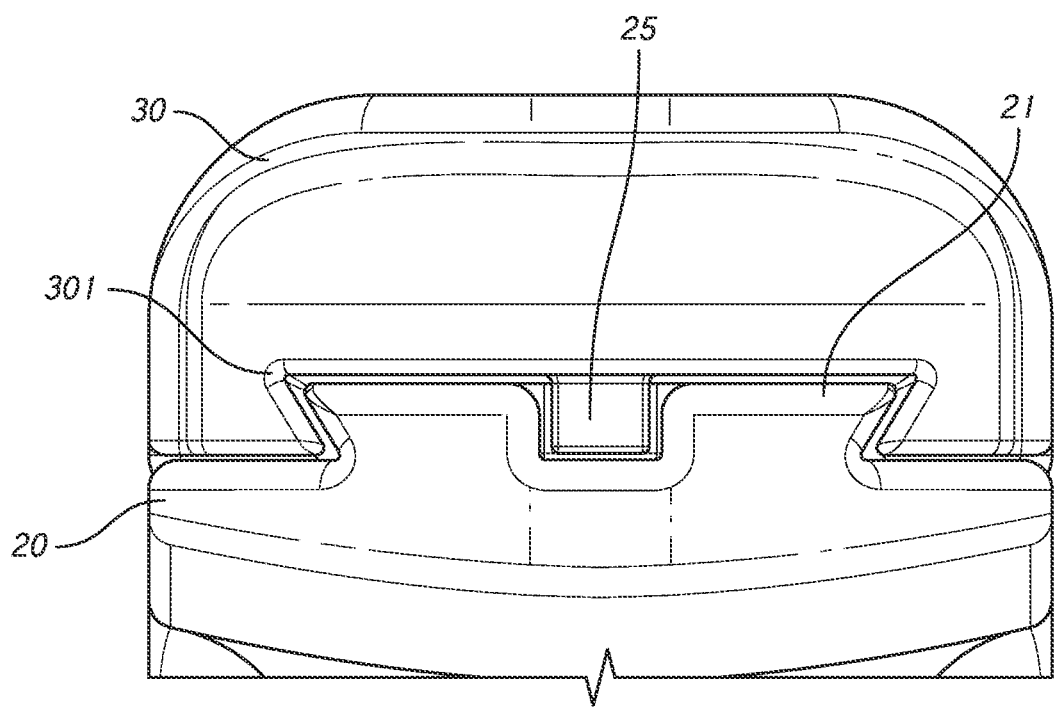
FIG. 22 is a front view of a retractor introducer in accordance with various embodiments of the present invention.

In accordance with various embodiments, retractor introducer apparatuses, systems and methods are provided, and various views of various embodiments of exemplary retractor introducer apparatuses, systems and aspects thereof are shown in FIGS. 1-28. In accordance with various embodiments, the retractor introducer system comprises a protector/retractor, such as a circumferential protector/retractor, and a retractor introducer. The retractor introducer comprises an actuator, a retractor blade and a handle. Through the combination and interaction of the actuator and the retractor blade, an inner ring and/or sheath or portions thereof of a retractor is placed, inserted and/or deployed through a natural orifice and/or an incision and into the body cavity. The retractor introducer interacts with the inner ring to more easily and efficiently deploy the retractor through small incisions and/or natural orifices and/or in procedures such as the vNOTES surgery where insertion by hand is particularly challenging. The retractor introducer aids in the process of inner ring insertion by holding and pressing or pushing the inner ring thereby making it easier on the surgeon to place the inner ring appropriately. The retractor introducer holds the inner ring and keeps it stable and if needed slightly compressed enough for the inner ring to fit through incision sizes for vaginal and abdominal procedures, as well as other procedures performed through incisions and/or other natural orifices. The retractor introducer also minimizes the use or the need for the surgical team to use excess retraction force or instruments as the surgeon's hand is not blocking his or her view while compressing or manipulating the inner ring. The retractor introducer is particularly useful in procedures where the surgical space is limited and often obscured, and/or where the incision and/or opening is very small.

In accordance with various embodiments, the retractor introducer facilitates the insertion, deployment, and placement of a circumferential protector/retractor and more specifically, in accordance with various embodiments, into the peritoneal cavity during transvaginal natural orifice transluminal endoscopic surgery (vNOTES). vNOTES and the associated circumferential protectors/retractors help overcome the limited access and visualization associated with conventional vaginal surgery, as well as, eliminate abdominal incisions and incision-related complications associated with conventional laparoscopy by accessing target organs through a colpotomy, a circumferential incision around the cervix. Once the colpotomy is created, an inner ring of the retractor is inserted around the cervix and through the circumferential colpotomy, into the peritoneal space. However, due to limited surgical operating space, e.g., the long, narrow anatomical space of the vaginal canal, it can be difficult for a surgeon to insert the inner ring and achieve proper placement within the peritoneal space or cavity. The retractor introducer allows the surgeon to easily insert the inner ring through the vaginal canal, around the cervix and into the peritoneal space, thereby removing or reducing the inner ring insertion and placement dependencies of patient anatomy and/or surgeon skill or techniques. As such, the retractor introducer is configured to remove or reduce the difficulties of inserting, placing and deploying an inner ring of a circumferential protector/retractor around the cervix and through the circumferential colpotomy.

The retractor introducer system, in various embodiments, includes a circumferential protector/retractor 3 (hereinafter referred to as "retractor") providing circumferential or 360 degrees of protection and/or retraction of an opening or orifice of a patient, providing unobstructed access into a patient's body or cavity. The retractor comprises an outer ring or support 5 and an inner ring or support 7. The inner and outer rings are connected by a film, fabric, membrane or sheath 9. In various embodiments, the retractor is adjustable in length, e.g., shortening the distance between the rings, by, for example, rolling the sheath around the outer ring, and such adjustment can apply a retraction or radial force to retract or enlarge an opening in a patient. The retractor in various embodiments is adjustable in length or otherwise adjustable to accommodate different patient body types, channel lengths or body wall thickness. In various embodiments, the retractor has a fixed or predetermined length and/or is not adjustable in length by rolling the outer ring or by other similar arrangements. The outer ring 5 is configured to be placed outside of the patient for ease of accessibility, adjustment of the retraction force and/or placement of the retractor. In various embodiments, a sealing or gel cap may be attached to the outer ring of the retractor.

The retractor is sufficiently flexible to be atraumatic when the retractor is deployed or otherwise placed through and disposed in the opening of the patient. In various embodiments, the outer diameter or periphery of the retractor in operation and/or, as deployed, is delimited or is no larger than the outer diameter of the inner and/or outer rings. In various embodiments, the sheath 9 is made of an elastomeric or non-metallic material to be atraumatic and/or not or minimally thermally conductive when the retractor is in operation or deployed or otherwise placed through and disposed in the opening of the patient. In various embodiments, the sheath is made of one or more layers of material and in various embodiments is anisotropic, e.g., stretchable or extendable longitudinally but not or minimally radially, being made of or including one or more layers of a fabric or similar materials with such anisotropic characteristics. In various embodiments, the sheath is cylindrical in shape and/or is tapered having a larger upper diameter relative to a smaller lower diameter. In various embodiments, the outer ring has a diameter greater than the inner ring. The inner ring, in various embodiments, is collapsible, foldable, or otherwise flexible to be deformable. In various embodiments, the inner ring has an initial or resting state generally circular or elliptical shape and is moveable, e.g., collapsed, folded and/or deformed, into a generally oblong shape. The inner ring, in various embodiments, is movable back to the resting state and/or is biased to do so. In various embodiments, the outer ring is more rigid than the inner ring and/or resists movement to a collapsed or folded state, i.e., is not collapsible or foldable.

In accordance with various embodiments, the retractor introducer comprises a handle 10, retractor blade 20 and an actuator 30. In various embodiments, the retractor introducer is generally L-shaped with the handle 10 forming one part of the "L" and the retractor blade 20 and/or actuator 30 forming the other part of the "L". The retractor introducer is more rigid than the retractor 3 in its entirety and/or at least portions thereof. In various embodiments, the retractor blade 20 and/or actuator 30 is more rigid than the inner ring 7 of the retractor 3. The retractor introducer, in accordance with various embodiments, removes or reduces the difficulties of inserting, placing, and deploying the inner ring 7 of the retractor 3, e.g., around the cervix and/or through the circumferential colpotomy.

In various embodiments, the length of the retractor blade 20 is configured to extend through a patient's vaginal canal and/or into a colpotomy incision. In various embodiments, the length of the retractor blade is at least 3 inches (7.5 centimeters). In various embodiments, the retractor blade has a length that is equal or greater than the length of an averaged sized vaginal canal plus the length of a colpotomy incision. The overall width of the retractor blade 20 is configured to provide retraction and/or visualization of the vaginal canal, while still being insertable into the colpotomy incision.

In various embodiments, the actuator 30 is slidably connected to the retractor blade 20 and in various embodiments the actuator slides linearly along the length of the retractor blade. In various embodiments, the actuator 30 is movable linearly relative to the retractor blade 20 and is prevented from pivoting or tilting relative to the retractor blade. In various embodiments, the actuator 30 is configured to slide linearly along the length of the retractor blade 20 without separation or disassembly from the retractor blade. In various embodiments, the retractor introducer has a generally T-shaped with the handle 10 forming one part of the "T" and the retractor blade 20 and/or actuator 30 moved from each other forming the other part of the "T" in addition to having a generally L-shaped with the handle 10 forming one part of the "L" and the retractor blade 20 and/or actuator 30 being proximate to each other forming the other part of the "L". In various embodiments, the handle 10 is generally cylindrical or tubular in shape, and/or dimensioned or sized, e.g., in length, width, and/or circumference, facilitating grasping, gripping or otherwise maintain user control of the handle 10 and the overall retractor introducer. In various embodiments, the handle 10 comprises a flared base or distal end further, for example, assisting in handling and/or maintaining control of the handle 10 and/or the retractor introducer. In various embodiments, the handle and/or other portions of the retractor introducer comprises one or more cavities visible and/or not visible by a user further reducing the overall weight of the retractor introducer or portions thereof, assisting, e.g., in handing and/or maintain control of the retractor introducer or portions thereof, and/or reducing costs.

In accordance with various embodiments, the retractor blade 20 comprises an I-beam integrated or otherwise attached to the retractor blade. In various embodiments, the cross-section of the retractor blade 20 is an I-Beam or has an I-Beam shape. The I-Beam cross-section helps to strengthen the retractor blade when used, for example, for moderate retraction of the vaginal canal. In various embodiments, an upper portion of the I-Beam, e.g., a portion facing and/or spaced away from the handle, is smaller in width than a lower portion of the I-Beam.

In various embodiments, the retractor blade 20 comprises a lower retractor blade 22 and an upper retractor blade 24 spaced from the lower retractor blade 22. The width of the upper retractor blade 24 is less than that of the width of the lower retractor blade, allowing for a linear sliding motion of the actuator 30 without resulting in direct contact with patient tissue in the area of retraction with the lower retractor blade 22. The width difference, in accordance with various embodiments, also allows for a generally narrow retractor blade and facilitates easier placement into the colpotomy. The upper and lower retractor blades also help to strengthen the overall retractor blade when used for moderate retraction of the vaginal canal. In various embodiments, a lengthwise column or support extends between the upper and lower retractor blades, supporting and separating the blades.

The lower retractor blade 22 spaced from the upper retractor blade 24 defines one or more channels 23 therebetween. In various embodiments, two channels are disposed on opposing sides of each other and in various embodiments, one continuous channel is provided between the lower and upper retractor blades 22, 24. In various embodiments, the retractor blade has a first, left channel and a second, right channel with both channels disposed between the upper and lower retractor blades. In various embodiments, one or more channels are disposed within the middle, center or generally middle and/or center portions of the retractor blade and/or along the one or more sides of the retractor blade.

The actuator 30 comprises one or more ledges, shelves or slides 31 configured to engage and/or travel between the upper and lower retractor blades and/or within the one or more channels. The one or more channels provides a linear track extending lengthwise along the retractor blade through which the one or more ledges 31 can travel un-obstructively. The interaction of the one or more ledges 31 of the actuator 30 and the spacing between the retractor blades 22, 24 prevents separation of the actuator from the retractor blade 20 and vice versa, while simultaneously allowing the actuator 30 to slide linearly relative to the retractor blade 20. The spacing between the retractor blades 22, 24 in various embodiments is such that it provides the actuator 30 a smooth and controlled sliding motion along the retractor blade 20. In various embodiments, the pairing of the one or more ledges with the one or more channels allows the actuator 30 to slide linearly along the length of the retractor blade 20 while preventing upward or pivotable motion of the actuator away from the retractor blade. In various embodiments, a linear rack is provided in one or more channels to interact with a tooth or projection on the actuator to provide incremental movement of the actuator relative to the retractor blade.

In various embodiments, the overall width of the actuator 30 is equal to and/or less than that of the lower retractor blade 22. The width of the actuator 30 is sized to reduce friction within the patient anatomy and also to mitigate any concerns for tissue entrapment during insertion. As such, in various embodiments, the retractor blade 20 has a width larger than that of the width of the actuator 30 to prevent tissue contact with the actuator when the retractor blade is in contact with tissue. In various embodiments, the retractor blade spaces or is between the actuator and tissue in which the retractor blade is in contact with. As such, the actuator 30 is spaced away and not in contact with tissue in which the retractor blade 20 is in contact with.

In various embodiments, a distal tip 34 of the actuator 30 has a convex curvature or shaped surface, as illustrated as curve 63, and/or is configured to have a curvature that enables the inner ring to be supported, captured, grasped and/or guided into the anterior colpotomy. In various embodiments, the convex curvature or shape is formed or defined by sidewalls of the distal tip 34 with outwardly curved surfaces. The sidewalls with outwardly curved surfaces, in various embodiments, are arranged to match a curved surface of the inner ring. In various embodiments, the convex curvature of the distal tip is arranged to engage a curved and/or concave portion of the inner ring. In various embodiments, pushing or guiding of the inner ring initially occurs longitudinally or linearly (vertically), as shown, for example, by arrow 400, rather than the radially (or horizontally). In various embodiments, the retractor introducer does not collapse or minimally collapse the inner ring and as such, less force is needed or applied and bounce back of the ring is avoided or significantly reduced.

In various embodiments, the actuator 30 has a distal tip 34 with an overhanging lip 36 extending therefrom and/or configured to keep the inner ring 7 engaged during motion through the vaginal canal and guided into the peritoneal space. In various embodiments, the engaged portion or portions thereof of the inner ring is positioned between the overhanging lip and the retractor blade. In various embodiments, portions of the inner ring 7 adjacent or proximate such an engaged portion of the inner ring with the actuator and/or the overhanging lip sits or rides on top of the retractor blade. In various embodiments, the convex curved surface or outwardly curved sidewalls or surfaces of the actuator are disposed under the overhanging lip between the overhanging lip and the retractor blade. As such, in various embodiments, the convex curved surface or outwardly curved sidewall or surface is offset or indented from a distal most end of the actuator with the overhanging lip disposed having an end disposed at the distal most end of the actuator. In various embodiments, the distal tip or end of the actuator may include the overhanging lip, the convex or outwardly curved surface, or both.

In various embodiments, the actuator is configured to contact, hold and/or move portions of the inner ring from a proximate position on the retractor blade to a distal position on and/or off the retractor blade along with various intermediate positions therebetween. As exemplarily illustrated, in an initial or spaced position, the proximal end and/or the proximal flange of the actuator is distal from the handle and/or proximal end or portion of the retractor blade. In various embodiments, in a load position, the proximal end and/or the proximal flange of the actuator is distal from the handle and/or proximal end or portion of the retractor blade and the inner ring is placed or loaded to be in contact with the proximal portion of the retractor blade and a distal portion of the actuator. In a deployed position, the proximal end and/or the proximal flange of the actuator is proximate, adjacent to or in contact with the handle and the distal end of the actuator is proximate, adjacent to or in contact with a distal end or portion of the retractor blade with the inner ring is positioned or sits at a distal position on, off or nearly off the retractor blade. In accordance with various embodiments, the retractor introducer and in particular, the retractor blade and/or actuator are configured not to collapse the inner ring or otherwise generally deform or compress the inner ring to deform the generally circular shape delimited by the inner ring.

In accordance with various embodiments, the distal tip 34 of the actuator comprises a divot 38, having a concave or inwardly curved surface, at its axial centerline configured to be in contact with an inner ring during insertion of the inner ring into the posterior colpotomy. In various embodiments, the divot 38 helps keep the inner ring 7 centered or aligned relative to the actuator 30 and helps the force of the actuator to be distributed along a contact portion of the inner ring for optimal deployment into the peritoneal space. In various embodiments, this centering may further be useful when the inner ring is in a slightly compressed or collapsed state within the vaginal canal, around the cervix, at the time of the posterior insertion. In various embodiments, the divot 38 is delimited or defined by a distal surface having a concave shape or curvature on a lower distal portion of the actuator while an upper portion of the actuator extends to the distal tip 34 or overhanging lip 36. In various embodiments, the divot 38 is disposed between sidewalls having outwardly or convex surfaces and in various embodiments, the divot 38 is disposed between or under the overhanging lip between the overhanging lip and the retractor blade. As such, in various embodiments, the divot 38 is offset or indented from a distal most end of the actuator with the overhanging lip disposed having an end disposed at the distal most end of the actuator. In various embodiments, the divot is concave and is arranged to engage a convex portion of the inner ring in contact with the divot of the actuator. In various embodiments, the divot is concave or has a concave or inwardly curved surface and is arranged to support and engage the inner ring in a partially collapsed state. In various embodiments, the concave or inwardly curved surface matches a curved surface of the inner ring in a partially collapsed state. In various embodiments, the distal tip or end of the actuator may include the overhanging lip, the convex or outwardly curved surface, divot, or any combination thereof.

In various embodiments, a proximal end 33 of the actuator 30 has a rounded top with a symmetrical slightly outward protrusion to allow the user to grip and/or pull back the actuator with ease as they prepare for insertion of the retractor. The proximal end of the actuator comprises a proximal flange 35 extending generally orthogonally or transverse relative to a longitudinal axis of the actuator 30 that is parallel to a longitudinal axis of the retractor blade 20. The proximal flange 35 has a generally curved surface or area 37 and/or thumb indentation 39 within that area of the proximal flange 35 of the actuator that are configured to allow the user to grip, push and/or advance the actuator forward during insertion. In various embodiments, the proximal flange in contact with the handle prevents distal movement of the actuator and, in various embodiments, the handle comprises a recess and the proximal flange is arranged to fit within the recess of the handle. In various embodiments, the proximal flange is graspable, grippable and/or movable by a user and that movement of the proximal flange moves the actuator. In various embodiments, the proximal flange has a length half or less than half the length of the handle.

In accordance with various embodiments, the retractor blade 20 and actuator 30 are configured to limit motion of the actuator in the proximal direction and/or prevent disassembly or separation of the actuator 30 from the retractor blade 20. In various embodiments, the retractor blade comprises one or more ribs 26 near the handle 10 and away from the distal end of the retractor blade 20. The one or more ribs 26 are positioned such that the actuator 30 remains engaged with the retractor blade 20 in an initially spaced or resting position. From the resting position, the amount of engagement between the actuator and retractor blade, e.g., the one or more ledges and the upper blade, are such that it allows for initiation of forward sliding motion without binding.

In various embodiments, one or more projections or hooks 32 extends from the actuator near a distal portion of the actuator and the one or more ribs 26 extends from the retractor blade near a proximal portion of the actuator. In various embodiments, the one or more ribs 26 are configured to engage with the one or more hooks or vice versa. In various embodiments, when the actuator is in a proximate most spaced position in which the proximal flange is distally spaced from the handle and/or the distal end of the actuator is distal or at a distal most position from the distal end of retractor blade, e.g., in or near an initial or load position or resting position, the one or more ribs 26 are engaged with the one or more hooks 32. The one or more hooks 32, in various embodiments, extends laterally from an inner surface on the side of the actuator 30 and towards the retractor blade 20. In various embodiments, the one or more hooks 32 extends laterally from the one or more ledges 31. In various embodiments, the one or more hooks 32 has a distal facing rounded or curved surface and the one or more ribs 26 has a proximal facing round or curved surface or vice versa to facilitate assembly or connection of the actuator with the retractor blade. In various embodiments, the one or more hooks and/or ribs prevents proximal movement of the actuator relative to the retractor blade beyond a predetermined point. In various embodiments, the engagement of the one or more ribs 26 and the one or more hooks 32 act as a hard stop delimiting the distal most spaced position of the actuator relative to the retractor blade 20 and/or to prevent complete separation, removal or disassembly of the actuator 30 from the retractor blade 20. In various embodiment, this distal most spaced position is an initial, load and/or resting position. In various embodiments, the retractor blade comprises an upper and lower retractor blade spaced to delimit one or more channels and the actuator comprises one or more ledges 31 configured to slide within the one or more channels. In various embodiments, the one or more ribs 26 are positioned within the one or more channels. In various embodiments, the retractor blade comprises one or more ribs and the actuator comprises one or more hooks and/or vice versa. In other various embodiments, the actuator comprises an upper and lower actuator spaced to delimit one or more channels and the retractor blade comprises one or more ledges configured to slide within the one or more channels and/or with one or more ribs positioned within the one or more channels and/or one or more hooks positioned on the one or more ledges.

In accordance with various embodiments, the retractor blade 20 comprises one or more male dovetails 21 extending lengthwise along the retractor blade or portions thereof and the actuator 30 comprises one or more corresponding female dovetails 301 extending lengthwise along the actuator or portions thereof that mates accordingly with the one or more male dovetails 21. This corresponding matching or pairing allows the actuator 30 to slide linearly along the length of the retractor blade 20 while preventing upward or pivotable motion away from the retractor blade. In various embodiments, the pairing is disposed on one or more sides of the actuator and the retractor blade and/or one or more areas in or near the middle of the actuator and the retractor blade. In various embodiments, the actuator comprises the one or more female dovetails and the retractor blade comprises one or more corresponding male dovetails. In various embodiments, the actuator and retractor blade comprise a combination of male and female pairing dovetails. For example, in various embodiments, the actuator has a female dovetail and a male dovetail, and the retractor blade has a corresponding male dovetail and a corresponding female dovetail. In various embodiments, one or more channels within the actuator and/or retractor blade extending lengthwise at or near a middle or center portion or area of the actuator and/or retractor blade forms or delimits the one or more female dovetails. In various embodiments, one or more protrusions or projections extending from the retractor blade and/or actuator forms or delimits the one or more male dovetails. In various embodiments, one or more hooks 32 and one or more ribs 26 are provided with the paired dovetails to act as a hard stop delimiting the proximal most position of the actuator relative to the retractor blade and/or to prevent complete separation, removal or disassembly of the actuator from the retractor blade. In various embodiments, the retractor blade, the actuator, or both comprises one or more bars 25. In various embodiments, one or more ribs 26 and/or one or more hooks 32 are disposed on or extends from the one or more bars. In various embodiments, the one or more bars 25 extend lengthwise along the actuator, the retractor blade or both with corresponding channels on the respective actuator, retractor blade or both to receive the one or more bars. In various embodiments, the actuator comprises at least one bar 25 extending lengthwise along the actuator that mates or is received by at least one channel disposed in the retractor blade, with the at least one bar providing stability to the actuator as it travels across the retractor blade.

Figure 23:
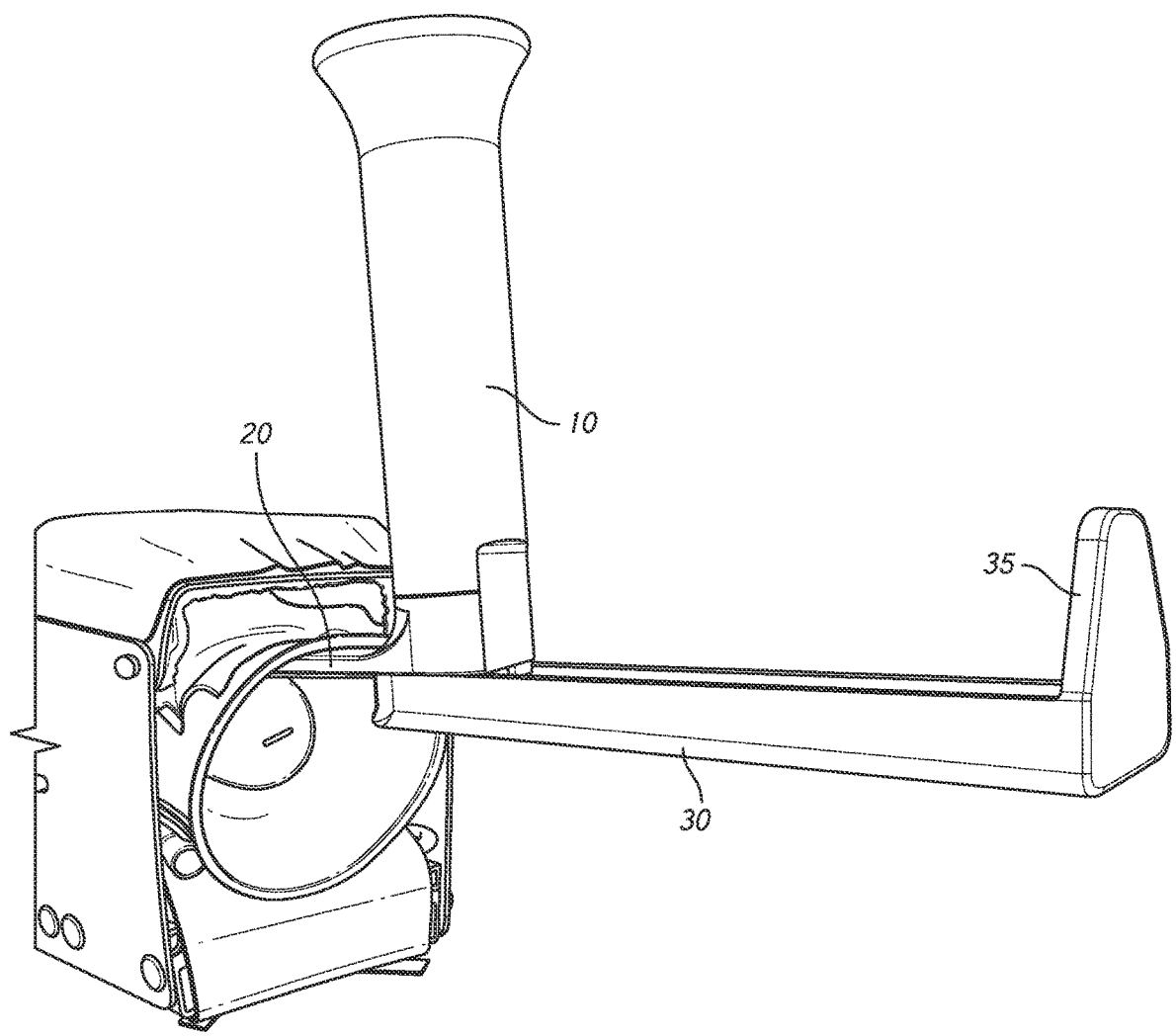
FIGS. 23-26 provide various views of a retractor introducer and retractor in operation as exemplarily shown in conjunction with a simulated pelvis in accordance with various embodiments of the present invention.
Figure 24:
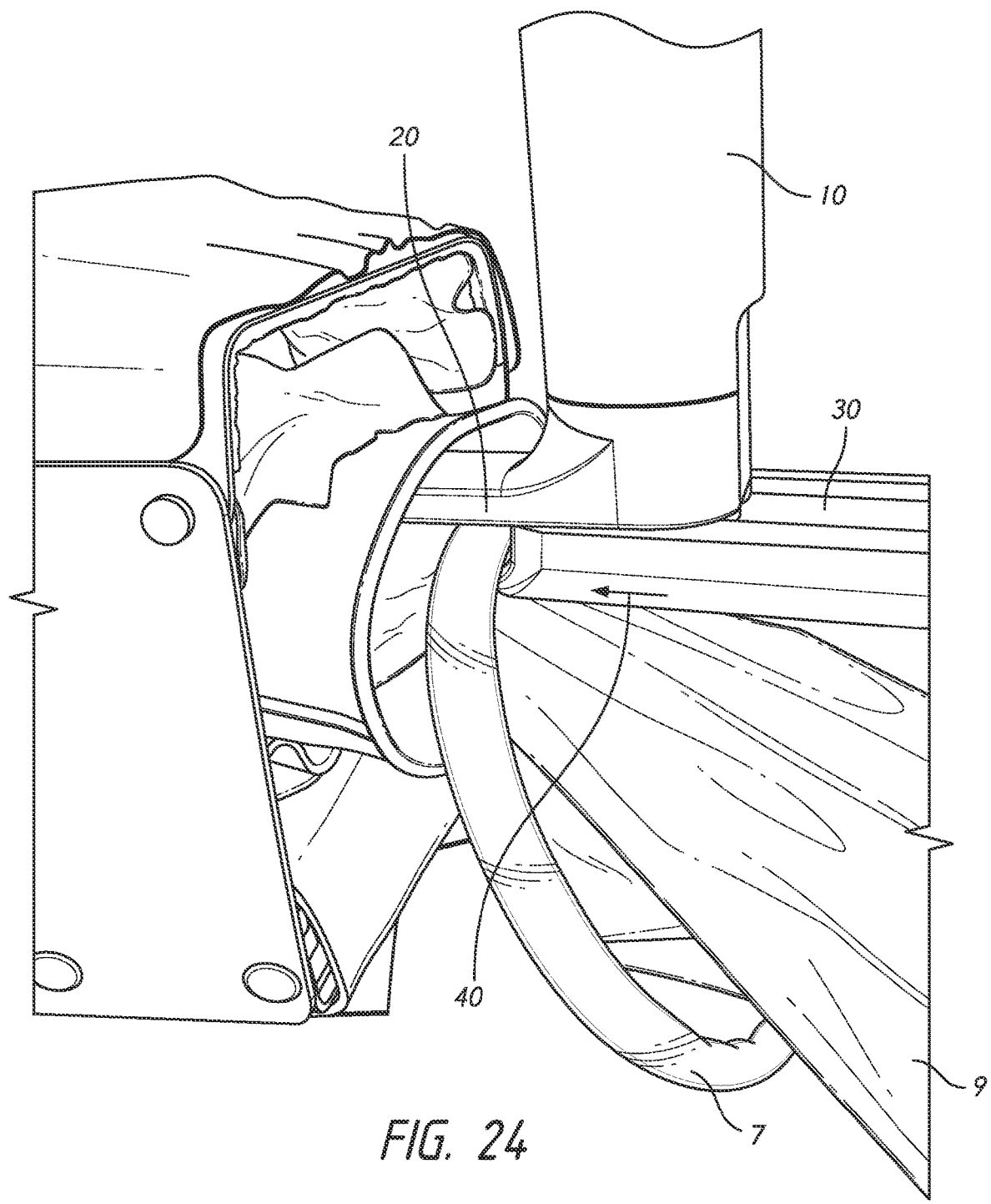

In operation, in accordance with various embodiments, after creating the circumferential colpotomy, holding the handle 10 of the retractor introducer, the user would slide the actuator 30 to an initial distal position, thus allowing the retractor blade 20 to be inserted into the anterior position of the colpotomy incision without potential obstruction by the actuator, as shown, for example, in FIG. 23. Once the retractor blade 20 is inserted, the user can tilt, pivot and/or pull the blade upward to slightly open and/or retract the incision and/or opening and/or load the inner ring between the retractor blade 20 and the actuator 30, placing a longitudinal inner ring profile at the distal end of the actuator, as shown, for example, in FIG. 24. As such, the retractor blade is placed between the actuator and surrounding tissue preventing potential interference or obstruction of the actuator or unintended tissue trauma while also providing point retraction and/or limited area retraction. At this point, the user may optionally also use a tenaculum to pull and hold the cervix through the middle of the inner ring and the sheath of the retractor, e.g., through the access channel, further assisted by the retractor introducer. As illustrated, the handle 10 extends upwardly, transverse or orthogonally away from the patient, the longitudinal axis of the retractor introducer and/or the upper portion of the patient. Likewise, proximal flange 35 of the actuator extends upwardly, transverse or orthogonally away from the patient, the longitudinal axis of the retractor introducer and/or the upper portion of the patient.

The user engages the actuator 30 moving it distally forward to guide and push the inner ring through the anterior position of the incision or opening. In various embodiments, the actuator pushes against the inner ring and/or applies generally longitudinal force or pressure on the inner ring, generally shown by arrow 40. In various embodiments, the distal end of the actuator contacts and pushes along an outer surface 41 of the inner ring. The actuator, in various embodiments, glides or slides along the retractor blade without detaching or separating. As such, with the retractor blade in the incision or opening, the inner ring is guided and inserted into the incision and/or opening with a forward and/or distal motion of the actuator. In various embodiments, from loading the inner ring to inserting the inner ring and/or any intermediary positions therebetween, the retractor introducer does not or minimally deforms, pinches or collapses the ring, e.g., deforms the inner ring from a generally circular shape or an oblong shape, as such, the inner ring generally remains in an initial un-collapsed condition, e.g., inner portions of the inner ring are not near or touching opposing inner portions of the inner ring. However, such collapse of the inner ring, e.g., deforming from a generally circular shape or an oblong shape, can occur due to the patient's anatomy, e.g., the size and shape of the opening, in conjunction with the partial insertion of the inner by the retractor introducer.

Figure 25:
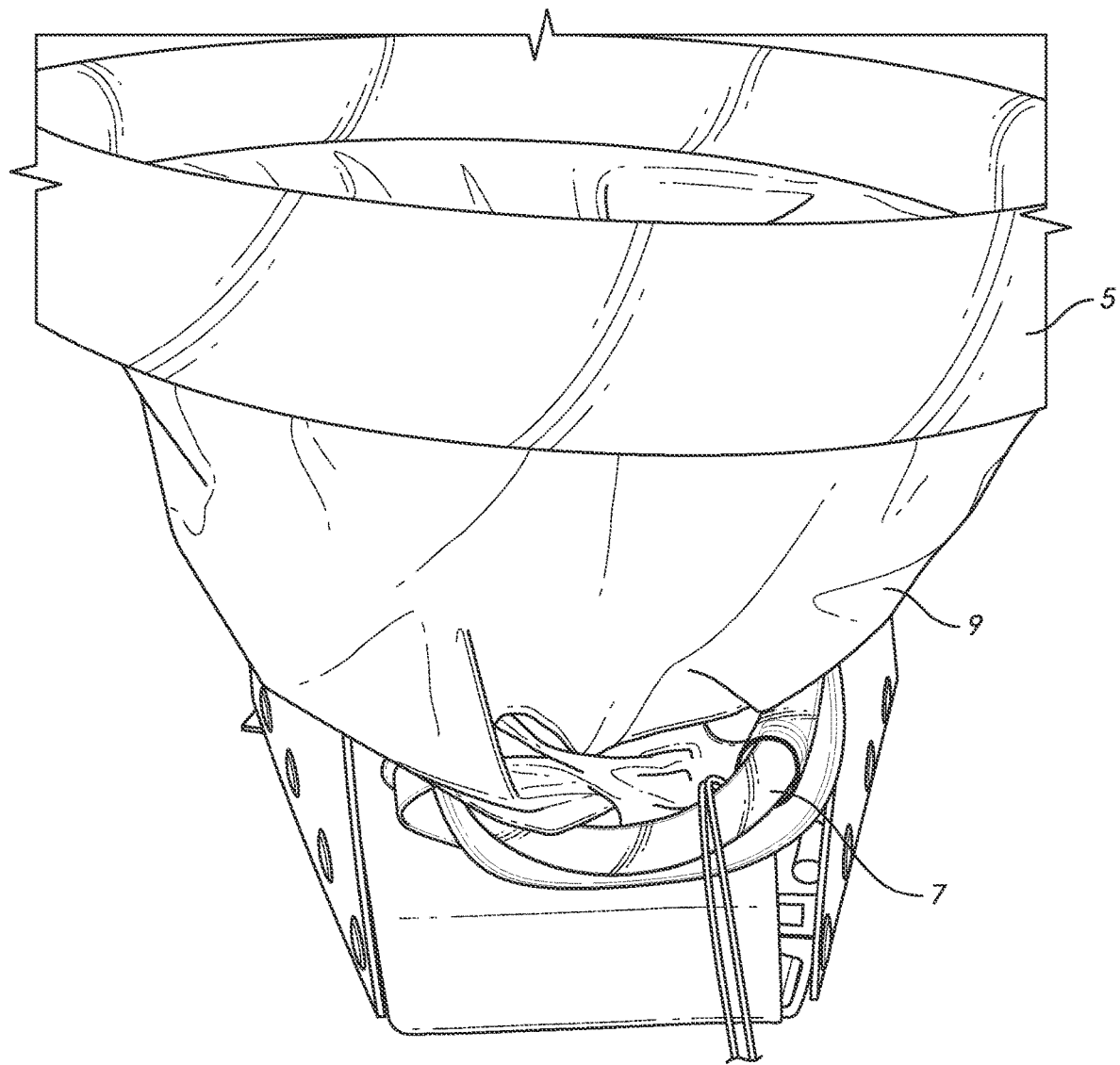
Figure 26:
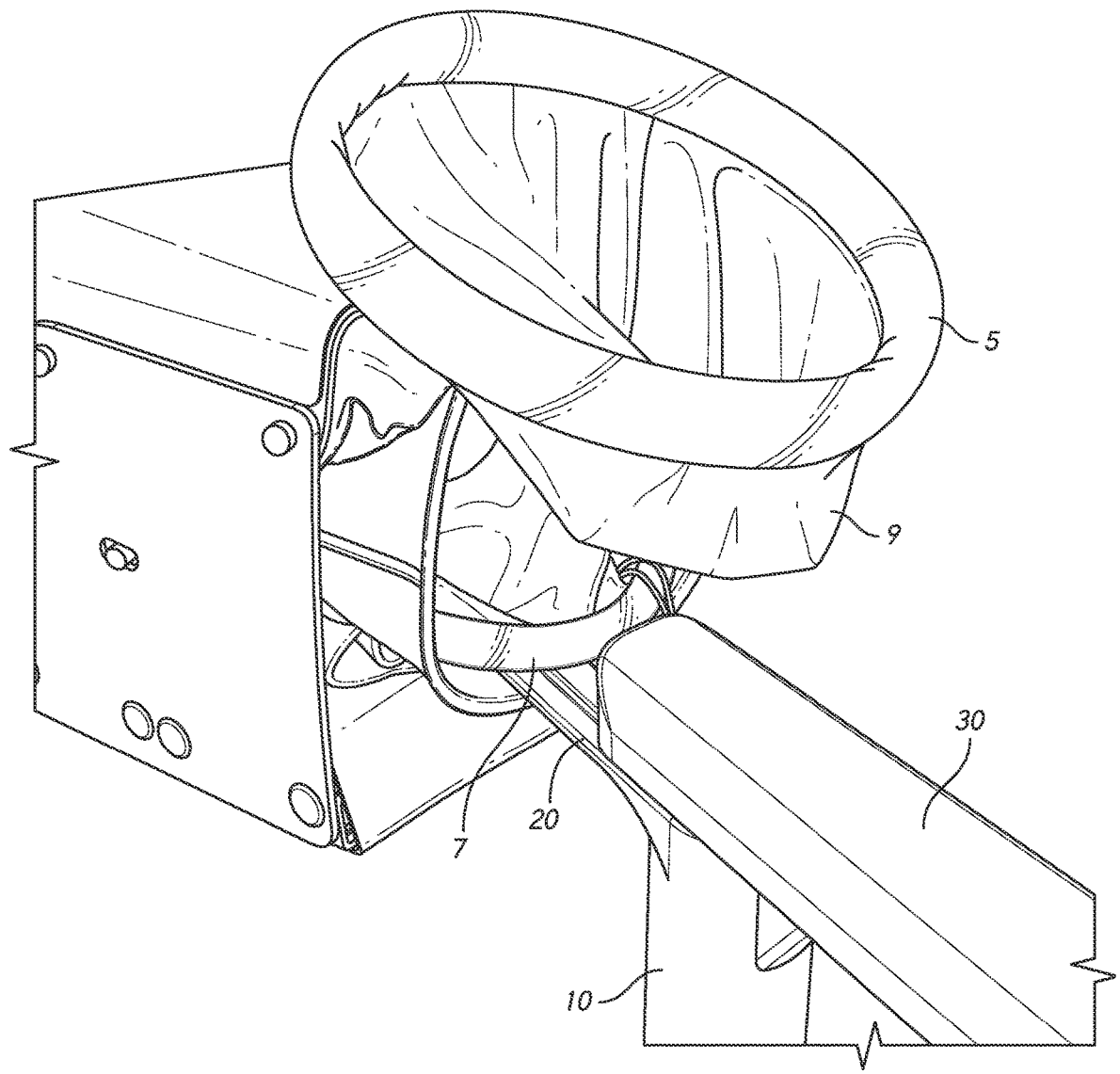
Figure 27:
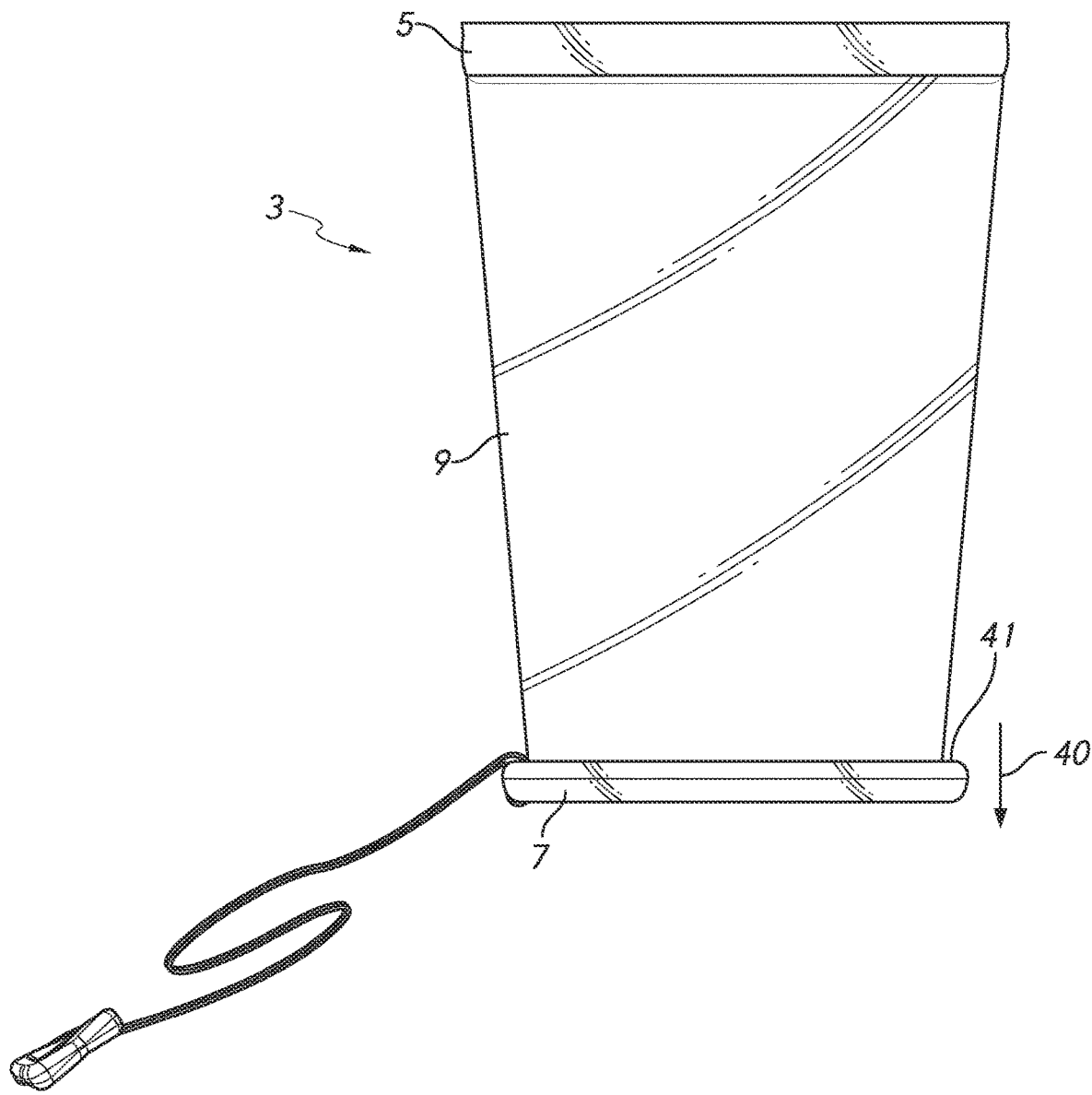
FIGS. 27-28 provide various views of a retractor in accordance with various embodiments of the present invention.
Figure 28:
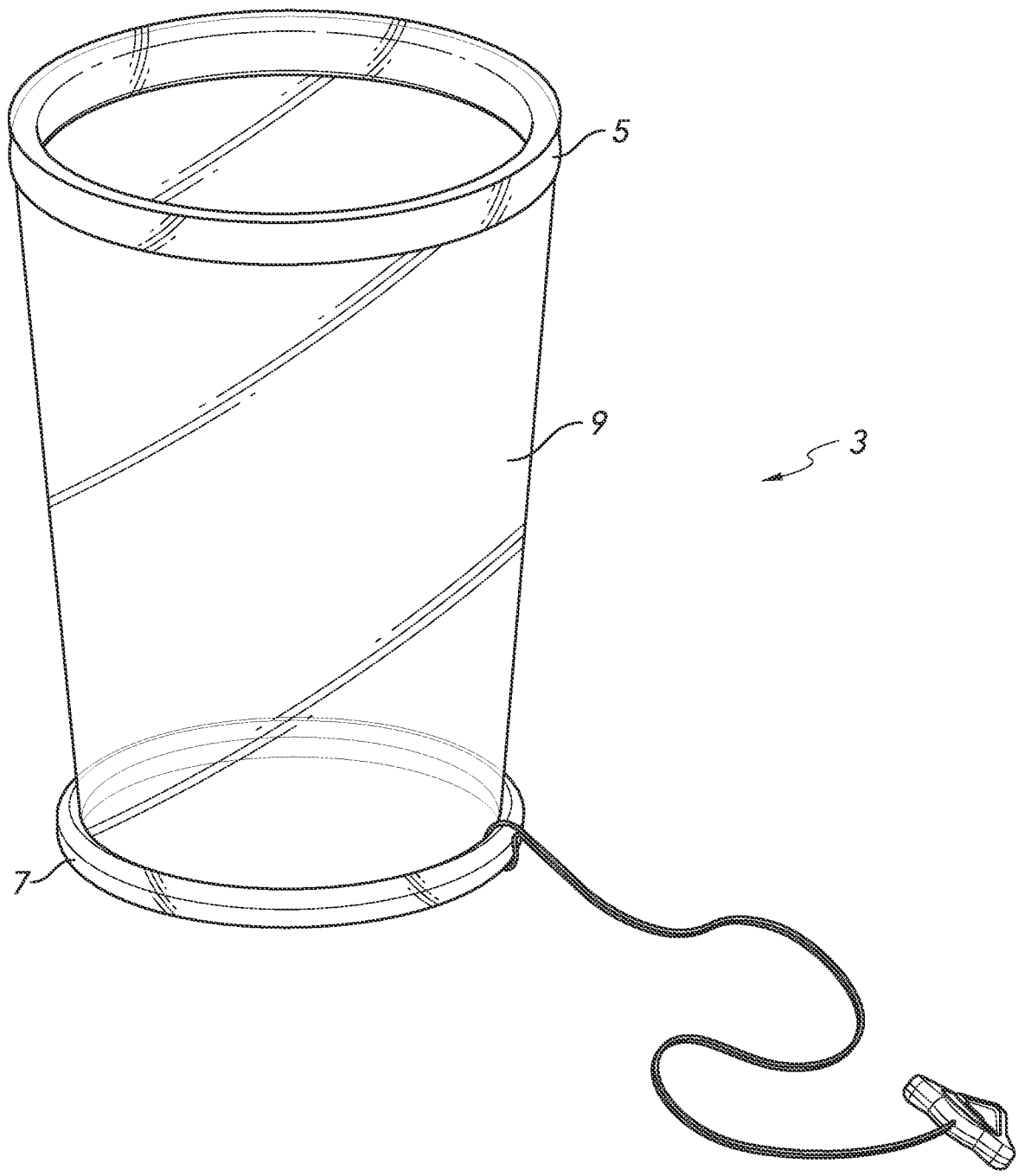

While keeping the inner ring in position within the incision or opening, the user would remove the retractor introducer from the incision/opening and the vaginal canal, as shown, for example, in FIG. 25. The user would rotate or invert the retractor introducer and move the actuator 30 to the spaced position to allow for insertion of the blade through the vaginal canal, under the retractor and/or the inner ring, and into the posterior position of the colpotomy. Once the retractor blade 20 is inserted, the user can tilt, pivot and/or pull the handle and/or blade downward to slightly open and/or retract the incision or opening and align the inner ring with the distal end of the actuator 30, as shown, for example, in FIG. 26. As illustrated, the handle 10 extends downward, transverse and/or orthogonally away from and relative to the patient, the longitudinal axis of the retractor introducer and/or the lower portion of the patient. Likewise, proximal flange 35 of the actuator extends downwardly, transverse and/or orthogonally away from and relative to the patient, the longitudinal axis of the retractor introducer and/or the lower portion of the patient.

The user would then advance the actuator 30 forward to push the inner ring through the vaginal canal, around the cervix, and into the circumferential incision or opening. The retractor introducer can then be removed to confirm the inner ring has properly seated in the peritoneal space. Once confirmed, the user can roll down the outer ring of the retractor to retract the incision and/or opening and continue with the surgical procedure, e.g., a vNOTES procedure. As shown in the figures, a surgical simulation model is provided for illustrative and/or demonstrative purposes and not intended to be limiting.

In various embodiments, in operation, the retractor introducer can also be used to guide, insert, and place the inner ring into a linear incision colpotomy. The retractor introducer is inverted similarly for anterior and posterior insertion of the inner ring. However, when inserting into a linear incision or opening, the cervix would remain intact and not pass through the center of the retractor.

In accordance with various embodiments, the handle 10, retractor blade 20, actuator 30 or any combination thereof are made of a semi-rigid or rigid polymer, e.g., polycarbonate. In various embodiments, the handle 10, retractor blade 20, actuator 30 or any combination thereof are more rigid than the inner ring 7 of the retractor 3. In various embodiments, the outer ring 5 of the retractor 3 is more rigid than the inner ring 7 but less rigid than the handle 10, retractor blade 20, actuator 30 or any combination thereof.

In various embodiments, the retractor introducer comprises two injection molded components with the handle 10 and retractor blade 20 being one component of one-piece unitary or monolithic construction and the actuator 30 being the second or other component. In various embodiments, the handle 10 comprises a first handle housing half 12 and a second handle housing half 14 and the retractor blade 20 is a separate component that attaches to the handle 10 as the first and second handle housing half are connected to each other as shown for example in FIG. 20. In various embodiments, the retractor blade is removable and/or replaceable relative to the handle. In various embodiments, the retractor blade can be replaced or is interchanged with other retractor blades having different dimensions and/or shapes to accommodate different anatomies, surgical sites and/or uses.

In various embodiments, the sheath is not attached or otherwise captured or gathered within the retractor blade and/or actuator. In various embodiments, the sheath is unobstructed or hangs or dangles freely relative to the retractor blade and/or actuator. In various embodiments, a distal portion of the sheath that is connected to the inner ring sits or is in contact with a distal end and/or the overhanging lip of the actuator with the rest of the sheath hanging freely therefrom and/or including the outer ring connected to the distal end of the sheath. In various embodiments, the actuator and/or the retractor blade are configured to only contact a portion of the inner ring and a portion of the outer surface of a distal portion of the sheath. In various embodiments, the actuator, retractor blade and handle are not in contact with the outer ring and/or a proximal portion of the sheath. In various embodiments, the inner ring is not confined, deformed and/or compressed by the actuator and/or the retractor blade. In various embodiments, only a first portion of the distal end or portion of the inner ring and/or a distal portion of the sheath are in contact with an inner surface of the retractor blade and/or a distal end or portion of the actuator and when the retractor introducer is repositioned, a second or different portion of the distal end or portion of the inner ring and/or the distal portion of the sheath are in contact with an inner surface of the retractor blade and/or a distal end or portion of the actuator. In various embodiments, in a first insertion position the sheath is disposed below or under the retractor blade and/or actuator with the handle extending away from the sheath and perpendicular relative to the actuator and/or retractor blade and in a second insertion position the sheath is disposed above the retractor blade and/or actuator with the handle extending away from the sheath and perpendicular relative to the blade and/or actuator.

In various embodiments, the actuator is configured to transmit a force on the inner ring and/or aligned or in direction along the height of the inner ring and, in various embodiments, at least initially. In various embodiments, the retractor blade is configured to not apply or transmit force on the inner ring and/or sheath. In various embodiments, the retractor blade is configured to apply atraumatic force on tissue in contact with an outer surface of the retractor blade when the handle is pivoted. In various embodiments, the retractor blade has a width that is generally half or less than half the diameter of the inner ring and delimiting an area in which only a portion of the inner ring sits. In various embodiments, the actuator has a width that is generally half or less than half the diameter of the inner ring and delimits an area in which only a portion of the inner ring is in contact with the distal end or portion of the actuator. In various embodiments, the handle has a length less than the length of the retractor blade and/or a width equal or less than the width of the retractor blade. In various embodiments, the handle has a thickness or delimits a generally cylindrical volume that is greater than a thickness of the retractor blade and/or the actuator. In various embodiments, the retractor blade has a length shorter than a length of the actuator. In various embodiments, the retractor blade, the actuator or both has a distal tapered end. In various embodiments, the retractor blade and/or the actuator has a ratchet, e.g., a linear rack with teeth, pawl, spindle, or the like, to allow selective or incremental positioning or sliding of the actuator relative to the retractor blade, distally and/or proximally. In various embodiments, the incremental or selective sliding of the actuator relative to the retractor blade may be selectively disengaged or disabled as desired by the user.

In various embodiments, the retractor introducer system may include a retractor and a retractor introducer, removably and operationally engaged with a retractor. In various embodiments, the retractor introducer may comprise a handle, a retractor blade, an actuator and/or any combination thereto. In various embodiments, the retractor blade may comprise an upper and a lower retractor blade. In various embodiments, the handle and retractor blade are made as a unitary or monolithic construction. In various embodiments, the handle extends perpendicular or is otherwise angled relative to the retractor blade and/or actuator. In various embodiments, the retractor blade has an outer surface configured to atraumatically engage or contact tissue, e.g., a vaginal canal. In various embodiments, the outer surface of the retractor blade, e.g., a distal end or tip, is smooth having no edges or atraumatic features or surfaces. In various embodiments, the retractor blade has an inner surface with portions in contact with an inner surface of the actuator. In various embodiments, the actuator has an inner and/or an outer surface configured to not be in contact tissue and in particular tissue in which the retractor blade is in contact therewith. In various embodiments, the actuator is movable. In various embodiments, the retractor blade is stationary. In various embodiments, the handle is stationary. In various embodiments, the retractor blade and/or the handle is stationary relative to the actuator that is movable. In various embodiments, the proximal flange of the actuator is parallel with the handle. In various embodiments, the actuator is movable longitudinally and lengthwise along an inner surface of the retractor blade. In various embodiments, the actuator is movable relative to the retractor blade and/or cannot be removed or completely separated from the retractor blade.

In various embodiments, the retractor, surgical access device, or the like provides access or a channel or pathway into a patient's body cavity and/or in various embodiments may be flexible being able to bend and/or allow tissue or the like to deform or compress portions thereof. In various embodiments, the retractor is adjustable in length to accommodate different patient anatomies and/or 360 degrees of hands-free protection and/or retraction of the opening in the patient. In various embodiments, the retractor may not include an outer ring, an inner ring or both.

The above description is provided to enable any person skilled in the art to make and use the devices or systems and perform the methods described herein and sets forth the best modes contemplated by the inventors of carrying out their inventions. Various modifications, however, will remain apparent to those skilled in the art. It is contemplated that these modifications are within the scope of the present disclosure. Different embodiments or aspects of such embodiments may be shown in various figures and described throughout the specification. However, it should be noted that although shown or described separately each embodiment and aspects thereof may be combined with one or more of the other embodiments and aspects thereof unless expressly stated otherwise. It is merely for easing readability of the specification that each combination is not expressly set forth.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

The invention claimed is:

1. A retractor introducer system comprising:
    a retractor comprising:
        an outer ring arranged to be placed outside of a body cavity;
        an inner ring arranged to be placed inside of the body cavity; and
        a sheath having a proximal end connected to the outer ring, a distal end connected the inner ring and a lumen extending from the proximal end to the distal end of the sheath, the sheath delimiting an access channel extending through the lumen and extending from the outer ring to the inner ring; and
    a retractor introducer arranged to releasably support the inner ring, the retractor introducer comprising:
        a retractor blade having a proximal end, a distal end and a longitudinal axis extending from the proximal end of the retractor blade to the distal end of the retractor blade;
        an actuator slidably attached to the retractor blade and translatable along the retractor blade and the longitudinal axis of the retractor blade from the proximal end of the retractor blade towards the distal end of the retractor blade and retractable back from the distal end of the retractor blade towards the proximal end of the retractor blade; and
        a handle connected to the retractor blade and extending in a direction transverse to the longitudinal axis of the retractor blade, the handle being stationary relative to the retractor blade and the actuator being movable relative to the handle;
        wherein the retractor blade comprises a channel extending lengthwise along the retractor blade and the actuator comprises a ledge arranged to translate along the channel of the retractor blade as the actuator is moved distally and proximally.

2. The system of claim 1 wherein the actuator is inseparable from the retractor blade and is unable to pivot away from the retractor blade.

3. The system of claim 1 wherein the retractor blade comprises at least one rib extending in a direction transverse to the longitudinal axis of the retractor blade and the actuator comprises at least one hook extending in a direction transverse to the longitudinal axis of the retractor blade, the at least one rib and the at least one hook in contact with each other prevents proximal movement of the actuator relative to the retractor blade beyond a predetermined point.

4. The system of claim 1 wherein the actuator comprises a tip positioned under an overhanging lip, the tip having sidewalls with outwardly curved surfaces arranged to match a curved surface of the inner ring.

5. The system of claim 4 wherein the overhanging lip and an upper surface of the retractor blade support a portion of the inner ring between the overhanging lip and the upper surface of the retractor blade.

6. The system of claim 5 wherein the actuator comprises a divot disposed between the outwardly curved surfaces of the tip and configured to contact a portion of the inner ring.

7. The system of claim 1 wherein the actuator comprises a proximal flange at the proximal end of the actuator, the proximal flange extending in a direction transverse to the longitudinal axis of the retractor blade and with the actuator moved to a distal most position, the proximal flange is arranged to contact the handle and prevent further distal movement of the actuator.

8. A retractor introducer system comprising:
    a retractor comprising:
        an outer ring arranged to be placed outside of a body cavity;
        an inner ring arranged to be placed inside of the body cavity; and a sheath having a proximal end connected to the outer ring, a distal end connected the inner ring and a lumen extending from the proximal end to the distal end of the sheath, the sheath delimiting an access channel extending through the lumen and extending from the outer ring to the inner ring; and a retractor introducer arranged to releasably support the inner ring, the retractor introducer comprising:

a retractor blade having a proximal end, a distal end and a longitudinal axis extending from the proximal end of the retractor blade to the distal end of the retractor blade;

an actuator slidably attached to the retractor blade and translatable along the retractor blade and the longitudinal axis of the retractor blade from the proximal end of the retractor blade towards the distal end of the retractor blade and retractable back from the distal end of the retractor blade towards the proximal end of the retractor blade; and a handle connected to the retractor blade and extending in a direction transverse to the longitudinal axis of the retractor blade, the handle being stationary relative to the retractor blade and the actuator being movable relative to the handle;

wherein the retractor blade has an I-Beam cross-sectional shape.

9. A retractor introducer system comprising:

a retractor comprising:

an outer ring arranged to be placed outside of a body cavity;

an inner ring arranged to be placed inside of the body cavity; and a sheath having a proximal end connected to the outer ring, a distal end connected the inner ring and a lumen extending from the proximal end to the distal end of the sheath, the sheath delimiting an access channel extending through the lumen and extending from the outer ring to the inner ring; and a retractor introducer arranged to releasably support the inner ring, the retractor introducer comprising:

a retractor blade having a proximal end, a distal end and a longitudinal axis extending from the proximal end of the retractor blade to the distal end of the retractor blade;

an actuator slidably attached to the retractor blade, movable distally along the retractor blade and the longitudinal axis of the retractor blade from the proximal end of the retractor blade towards the distal end of the retractor blade, and movable proximally from the distal end of the retractor blade towards the proximal end of the retractor blade, the actuator movable distally moves the inner ring of the sheath distally along the retractor blade and the longitudinal axis of the retractor blade and movable proximally disengages contact of the actuator with the inner ring of the sheath; and a handle connected to the retractor blade and extending in a direction transverse to the longitudinal axis of the retractor blade, the handle being stationary relative to the retractor blade, the actuator being movable relative to the handle, and the retractor blade further comprising a planar lower retractor blade and a planar upper retractor blade connected to and spaced from the planar lower retractor blade.

10. The system of claim 9 wherein the planar upper retractor blade is wider than the planar lower retractor blade and longer than the planar lower retractor blade and further comprising a first channel disposed between the planar upper and lower retractor blades and a second channel disposed between the planar upper and lower retractor blades, the first and second channels disposed on opposing sides of each other.

11. The system of claim 10 wherein the actuator comprises a first ledge disposed on one side of the actuator and disposed in the first channel, the first ledge being translatable within the first channel with linear movement of the actuator along the planar upper retractor blade, and a second ledge disposed on one side of the actuator and disposed in the second channel, the second ledge being translatable within the second channel with linear movement of the actuator along the planar upper retractor blade.

12. The system of claim 11 wherein the actuator has a width greater than or equal to a width of the planar upper retractor blade and has a curved outer surface extending lengthwise along the actuator, and the actuator further comprises at least one hook arranged to engage at least one rib disposed between the planar upper and lower retractor blades.

13. The system of claim 12 wherein the at least one hook extends from the actuator near a distal portion of the actuator and the at least one rib is disposed near a proximal portion of the planar upper and lower retractor blades, the at least one hook having a proximal facing surface and the at least one rib having a distal facing surface, the proximal facing surface of the at least one hook arranged to match the distal facing surface of the at least one rib.

14. The system of claim 13 wherein the actuator has a distal end with an overhanging lip and a divot disposed between outwardly curved side surfaces under the overhanging lip, the divot having an inwardly curved surface arranged to match a curved surface of the inner ring.

15. The system of claim 14 wherein the overhanging lip and an upper surface of the planar upper retractor blade support a portion of the inner ring between the overhanging lip and the upper surface of the planar upper retractor blade.

16. The system of claim 15 wherein the retractor introducer is arranged to be positioned in a first position to guide and push one portion of the retractor proximally and inverted relative to the first position to guide and push a different portion of the retractor proximally.

17. The system of claim 14 wherein the handle is removably attached to the retractor blade.

18. The system of claim 14 wherein the actuator comprises a proximal flange at the proximal end of the actuator, the proximal flange extending orthogonally relative to the longitudinal axis of the retractor blade and having a curved surface and the handle further comprises a recess and the proximal flange being arranged to fit within the recess of the handle.

19. The system of claim 18 wherein the proximal flange in contact with the handle prevents distal movement of the actuator, the proximal flange having a length smaller than a length of the handle and a cross-sectional shape being different from a cross-sectional shape of the handle, the proximal flange and the handle both being graspable by a user.

* * * * *